United States Patent
Yoon et al.

(10) Patent No.: US 9,916,016 B2
(45) Date of Patent: *Mar. 13, 2018

(54) METHOD OF INPUTTING USER INPUT BY USING MOBILE DEVICE, AND MOBILE DEVICE USING THE METHOD

(71) Applicant: SAMSUNG ELECTRONICS CO., LTD., Suwon-si (KR)

(72) Inventors: Yeo-jun Yoon, Suwon-si (KR); Ji-yeon Kwak, Seoul (KR); Joon-kyu Seo, Seoul (KR); Yong-yeon Lee, Suwon-si (KR); Young-joon Choi, Uiwang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,180

(22) Filed: Oct. 27, 2016

(65) Prior Publication Data
US 2017/0045956 A1    Feb. 16, 2017

Related U.S. Application Data

(63) Continuation of application No. 14/452,064, filed on Aug. 5, 2014, now Pat. No. 9,507,439.

(30) Foreign Application Priority Data

Aug. 5, 2013    (KR) .......................... 10-2013-0092657

(51) Int. Cl.
  *G06F 3/0346*    (2013.01)
  *G06F 3/01*    (2006.01)
  (Continued)

(52) U.S. Cl.
  CPC .......... *G06F 3/0346* (2013.01); *G06F 1/1694* (2013.01); *G06F 3/017* (2013.01);
  (Continued)

(58) Field of Classification Search
  CPC ...... G06F 3/0346; G06F 1/1694; G06F 3/017; H04M 1/72569
  (Continued)

(56) References Cited

U.S. PATENT DOCUMENTS 7,952,561 B2    5/2011    Liu et al.
8,194,926 B1    6/2012    Keysers
(Continued)

FOREIGN PATENT DOCUMENTS

CN    1656818 A    8/2005
CN    102439970 A    5/2012
(Continued)

OTHER PUBLICATIONS

Communication, Issued by the International Searching Authority, dated Nov. 11, 2014, in counterpart International Application No. PCT/KR2014/007195.
(Continued)

*Primary Examiner* — Fred Tzeng
(74) *Attorney, Agent, or Firm* — Sughrue Mion, PLLC

(57) ABSTRACT

Provided are a method of inputting a user input by using a mobile device and a mobile device using the method. The method of performing operations of the mobile device according to a plurality of input modes, the method being performed by the mobile device, includes operations of, determining whether the mobile device is placed on a surface, if the determining of whether the mobile device is placed on the surface indicates that the mobile device is
(Continued)

placed on the surface, changing an input mode of the mobile device, and performing a preset operation that corresponds to the changed input mode.

32 Claims, 36 Drawing Sheets

(51) Int. Cl.
    *G06F 1/16*     (2006.01)
    *H04M 1/725*     (2006.01)

(52) U.S. Cl.
    CPC ....... *H04M 1/725* (2013.01); *H04M 1/72522* (2013.01); *H04M 1/72569* (2013.01); *H04M 2250/12* (2013.01)

(58) Field of Classification Search
    USPC .......................................................... 345/156
    See application file for complete search history.

(56) References Cited

U.S. PATENT DOCUMENTS

| | | | |
|---|---|---|---|
| 8,811,304 B2 | 8/2014 | Ryu et al. | |
| 9,075,523 B2 | 7/2015 | Stallings | |
| 9,207,861 B2* | 12/2015 | Gan | G06F 1/1694 |
| 2005/0116045 A1 | 6/2005 | Chang | |
| 2007/0075969 A1 | 4/2007 | Oh et al. | |
| 2009/0153341 A1 | 6/2009 | Spalink | |
| 2009/0197635 A1 | 8/2009 | Kim et al. | |
| 2009/0265627 A1 | 10/2009 | Kim et al. | |
| 2010/0117975 A1 | 5/2010 | Cho | |
| 2011/0242035 A1 | 10/2011 | Nozawa | |
| 2011/0273388 A1 | 11/2011 | Joo et al. | |
| 2011/0310227 A1 | 12/2011 | Konertz | |
| 2012/0084691 A1 | 4/2012 | Yun | |
| 2012/0088489 A1* | 4/2012 | Shim | G06F 1/1626 455/418 |
| 2013/0084980 A1 | 4/2013 | Hammontree | |
| 2013/0120458 A1 | 5/2013 | Celebisoy | |
| 2013/0176264 A1 | 7/2013 | Alameh | |
| 2014/0028712 A1 | 1/2014 | Keating | |
| 2014/0062875 A1 | 3/2014 | Rafey | |
| 2014/0129176 A1 | 5/2014 | Ramanandan | |
| 2014/0225660 A1 | 8/2014 | Cheng | |
| 2015/0002475 A1 | 1/2015 | Tiao | |
| 2015/0035748 A1* | 2/2015 | Yoon | G06F 3/0346 345/156 |
| 2015/0286322 A1 | 10/2015 | Duteil | |
| 2015/0339021 A1 | 11/2015 | Duteil | |

FOREIGN PATENT DOCUMENTS

| | | |
|---|---|---|
| KR | 1020060056446 A | 5/2006 |
| KR | 100651368 B1 | 11/2006 |
| KR | 100790896 B1 | 1/2008 |
| KR | 1020100052227 A | 5/2010 |
| KR | 1020120036445 A | 4/2012 |
| KR | 1020130028573 A | 3/2013 |
| KR | 1020130031643 A | 3/2013 |
| WO | 2010056548 A1 | 5/2010 |
| WO | 2013028895 A1 | 2/2013 |

OTHER PUBLICATIONS

Non-Final Office Action dated Mar. 18, 2016 in U.S. Appl. No. 14/452,064.
Notice of Allowance dated Jul. 20, 2016 in U.S. Appl. No. 14/452,064.

* cited by examiner

FIG. 22
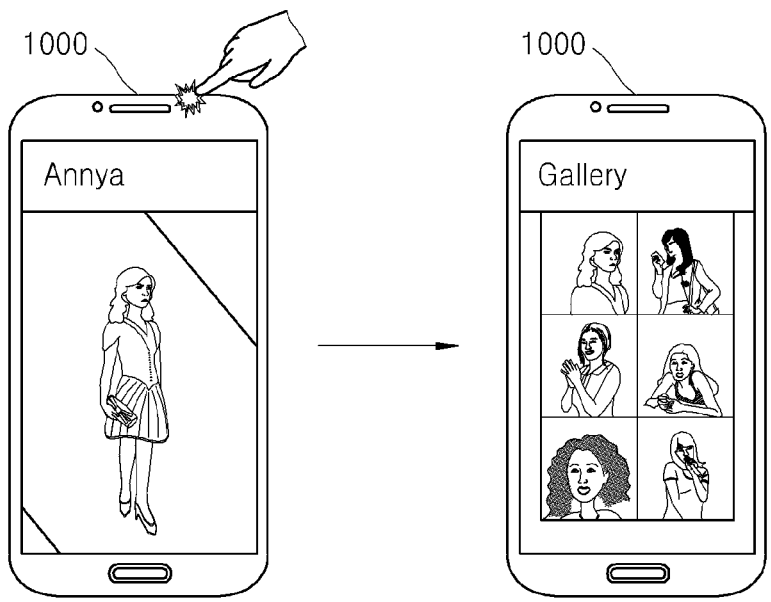
(a)
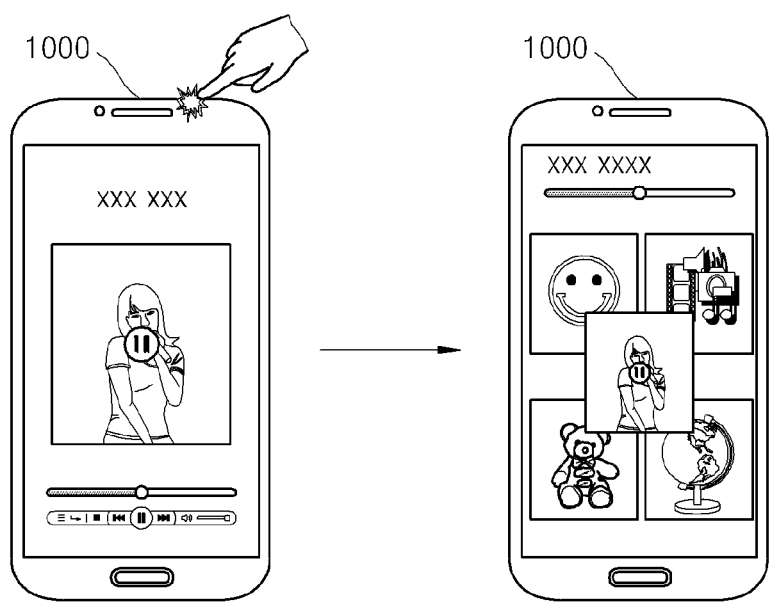
(b)

FIG. 39
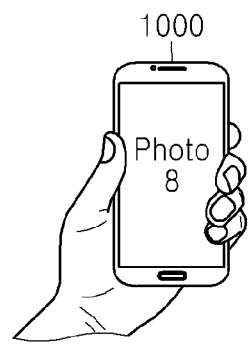
(a)
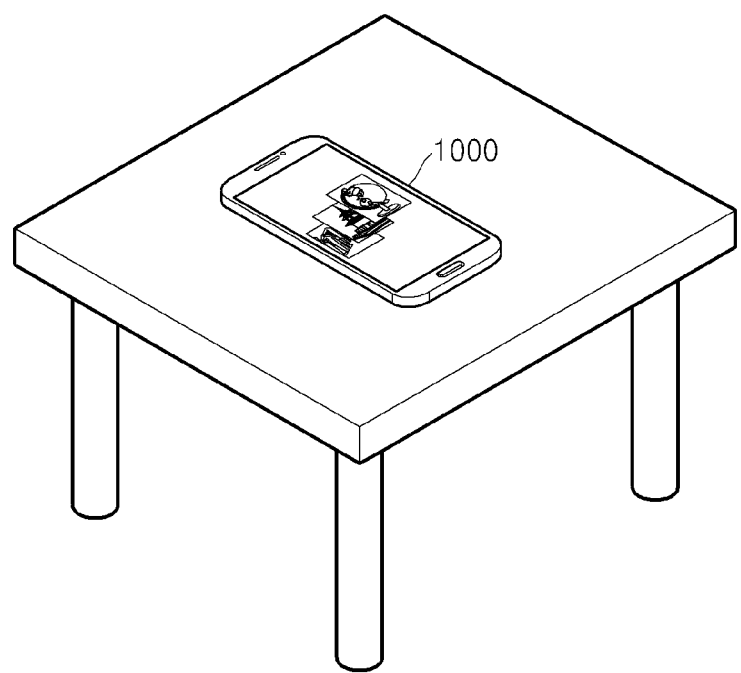
(b)

METHOD OF INPUTTING USER INPUT BY USING MOBILE DEVICE, AND MOBILE DEVICE USING THE METHOD

CROSS-REFERENCE TO RELATED APPLICATIONS

This application is a continuation of U.S. patent application Ser. No. 14/452,064, filed Aug. 5, 2014, which claims benefit of Korean Patent Application No. 10-2013-0092657, filed on Aug. 5, 2013, in the Korean Intellectual Property Office, the disclosures of which are incorporated herein in their entirety by reference.

BACKGROUND

1. Field

One or more exemplary embodiments relate to a method of inputting a user input by using a mobile device placed on a flat surface, and a mobile device using the method.

2. Description of the Related Art

Recently, mobile devices have been enabled to receive necessary information from a user via an input based on a touch screen panel (TSP). Thus, compared to a method of receiving a user input via a key input of a keypad, the user may more conveniently input information to a mobile device.

A mobile device may be manipulated by a user while the user holds the mobile device or while the mobile device is placed on a flat surface. In this case, as the number of functions that the mobile device has increased nowadays, it has become inconvenient for the user to use various functions of the mobile device by inputting a user input via the TSP only.

Accordingly, there is a demand for supporting various modes of inputting information according to a status of the mobile device, and for efficiently executing various operations of the mobile device.

SUMMARY

One or more exemplary embodiments may provide a method of inputting a user input by using a mobile device, and a mobile device using the method whereby the mobile device, when placed on a flat surface, may perform a preset operation according to a knocking input.

One or more exemplary embodiments may provide a method of inputting a user input by using a mobile device, and a mobile device using the method whereby the mobile device, when placed on a flat surface, may perform communication with another mobile device according to a knocking input.

One or more exemplary embodiments may provide a method of inputting a user input by using a mobile device, and a mobile device using the method whereby the mobile device, when placed on a flat surface, may perform a preset operation according to various inputs of moving the mobile device.

One or more exemplary embodiments may provide a method of inputting a user input by using a mobile device, and a mobile device using the method whereby the mobile device, when placed on a flat surface, changes an input mode and thus executes a preset operation according to the changed input mode.

Additional aspects will be set forth in part in the description which follows and, in part, will be apparent from the description, or may be learned by practice of the presented exemplary embodiments.

According to an aspect of an exemplary embodiment, there may be provided a method of performing operations of a mobile device according to a plurality of input modes, the method being performed by the mobile device and including operations of determining whether the mobile device is placed on a surface, if the determining of whether the mobile device is placed on the surface indicates that the mobile device is placed on the surface, changing an input mode of the mobile device, and performing a preset operation that corresponds to the changed input mode.

When the input mode is changed, the method may further include activating or deactivating a sensor in the mobile device, and changing an operation of the mobile device which corresponds to a user input.

The changing of the input mode may further include changing the input mode from an on-hand mode to an on-surface mode.

The method may further include determining whether the mobile device on the surface is held by a user, and when the determining of whether the mobile device on the surface is held by the user indicates that the mobile device is held by the user, changing the input mode from the on-surface mode to the on-hand mode.

The performing of the preset operation may include changing a user interface that is displayed on the mobile device to a user interface that corresponds to the changed input mode, and displaying the changed user interface.

The method may further include operations of receiving a user input with respect to the mobile device, and performing an operation that corresponds to the received user input, according to the changed input mode.

The method may further include determining a state in which the mobile device is placed on the surface, and the performing of the preset operation may include performing the preset operation that corresponds to the changed input mode according to the state in which the mobile device is placed on the surface.

The state in which the mobile device is placed on the surface may include at least one of a state in which the mobile device is placed on the surface so that a front surface of the mobile device faces the surface, a state in which the mobile device is placed on the surface so that a rear surface of the mobile device faces the surface, and a state in which the mobile device is placed vertically on the surface.

According to another aspect of an exemplary embodiment, there may be provided a method of performing an operation of a mobile device according to a user input, the method being performed by the mobile device and including: when the mobile device is placed on a surface, selecting an input mode from a plurality of input modes of the mobile device, receiving, from a user, a hitting input indicating that the user has hit the surface on which the mobile device is placed, and performing an operation that corresponds to the hitting input based on the selected input mode.

The plurality of input modes may include an on-hand mode and an on-surface mode, and when the mobile device is placed on the surface, the selecting of the input mode may include selecting the on-surface mode from among the plurality of input modes.

The method may further include establishing a communication channel with another mobile device placed on the surface, according to the hitting input.

The establishing of the communication channel may include, when the hitting input with a preset pattern is received, broadcasting connection information about the mobile device to the other mobile device, receiving, from the other mobile device, a connection request based on the connection information, and connecting with the other mobile device, according to the connection request.

The method may further include determining a location of the mobile device with respect to the other mobile device, based on the hitting input, and an object to be displayed on the mobile device and the other mobile device may be determined based on the location of the mobile device.

The method may further include receiving a tilting input for spacing apart a portion of the mobile device from the surface while another portion of the mobile device remains on the surface, and, when the tilting input is received, transmitting content that is displayed on the mobile device to the other mobile device.

The method may further include receiving, from a user, a bezel input indicating that a user has touched a portion of a bezel of the mobile device placed on the surface, and when the bezel input is received, transmitting content that is displayed on the mobile device to the other mobile device.

The receiving of the hitting input may include sensing a vibration that is generated when the surface is hit, by using a vibration sensor of the mobile device.

The receiving of the hitting input may include sensing a sound that is generated when the surface is hit, by using a microphone of the mobile device.

The method may further include sensing a movement of the mobile device placed on the surface, and performing an operation that corresponds to the sensed movement of the mobile device.

The sensing of the movement of the mobile device may include receiving a tilting input for spacing apart a portion of the mobile device from the surface while another portion of the mobile device is still placed on the surface.

The sensing of the movement includes sensing that a location of the mobile device on the surface is moved while the mobile device is still placed on the surface.

The sensing of the movement of the mobile device may include sensing that a direction of the mobile device on the surface is changed while the mobile device is still placed on the surface.

The method may further include receiving, from a user, a bezel input indicating that a user has touched a portion of a bezel of the mobile device placed on the surface, and performing an operation that corresponds to the bezel input.

The method may further include sensing a movement of the mobile device placed on the surface, wherein the sensed movement occurs in response to the bezel input, and performing an operation that corresponds to the bezel input and the sensed movement of the mobile device.

According to another aspect of an exemplary embodiment, there may be provided a mobile device configured to perform operations according to a plurality of input modes, the mobile device including a user inputter configured to sense a status of the mobile device; and a controller configured to determine, based on the status, whether the mobile device is placed on a surface, to change an input mode of the mobile device in response to determining that the mobile device is placed on the surface, and to perform a preset operation that corresponds to the changed input mode.

According to another aspect of an exemplary embodiment, there may be provided a mobile device configured to perform an operation according to a user input, the mobile device including a user inputter configured to receive, from a user, a hitting input indicating that the user has hit a surface on which the mobile device is placed; and a controller configured to, when the mobile device is placed on the surface, select an input mode from among a plurality of input modes of the mobile device, and perform an operation that corresponds to the hitting input based on the selected input mode.

According to another aspect of an exemplary embodiment, there may be provided a non-transitory computer-readable recording medium having recorded thereon a program which, when executed by a computer, performs the method of an aspect.

According to another aspect of an exemplary embodiment, there may be provided a non-transitory computer-readable recording medium having recorded thereon a program which, when executed by a computer, performs the method of another aspect.

BRIEF DESCRIPTION OF THE DRAWINGS

These and/or other aspects will become apparent and more readily appreciated from the following description of the exemplary embodiments, taken in conjunction with the accompanying drawings in which:

FIG. 22 illustrates an example when another object related to an object that is displayed on a screen of the mobile device is displayed on the screen of the mobile device in response to a bezel input, according to an exemplary embodiment;

FIG. 39 illustrates an example when a user interface displayed on the mobile device changes when the mobile device held by a user is placed on a flat surface according to an exemplary embodiment;

DETAILED DESCRIPTION

Figure 1:
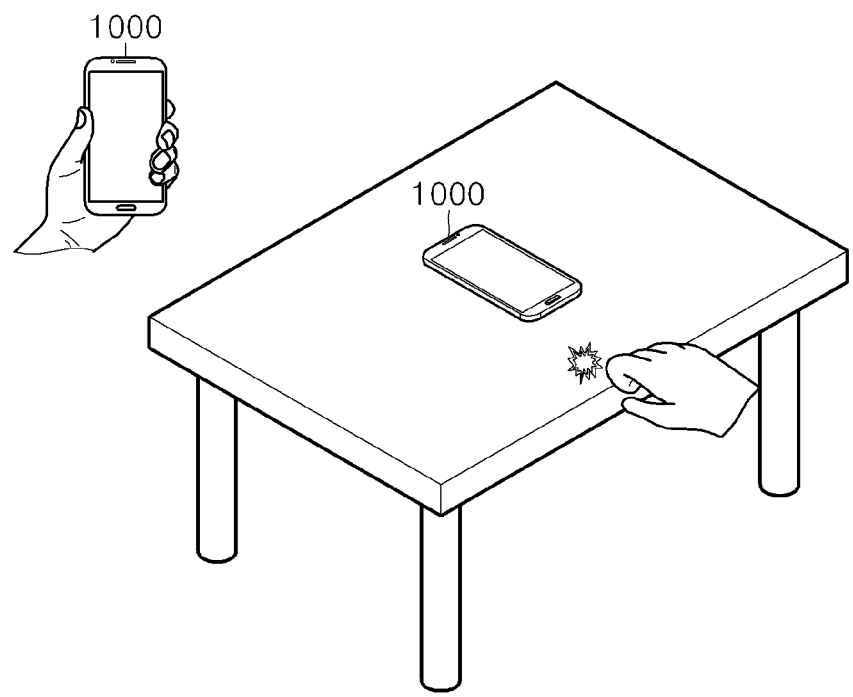
FIG. 1 illustrates an example showing a mobile device that is placed on a flat surface and receives a user input, according to an exemplary embodiment.

Hereinafter, exemplary embodiments will be described more fully with reference to the accompanying drawings. However, the exemplary embodiments may be embodied in many different forms and should not be construed as being limited to the exemplary embodiments set forth herein; rather, these exemplary embodiments are provided so that this disclosure will be thorough and complete, and will fully convey the concept of the exemplary embodiments to those of ordinary skill in the art. In the following description, well-known functions or constructions will not be described in detail so as not to obscure the exemplary embodiments with unnecessary detail. Also, throughout the specification, like reference numerals in the drawings denote like elements.

Throughout the specification, it will also be understood that when an element is referred to as being "connected to" another element, the element can be directly connected to the other element, or electrically connected to the other element while intervening elements may also be present.

Throughout the specification, the term "flat surface" indicates an object on which a mobile device may be placed. The flat surface may be a flat panel, a bent panel, or an uneven panel. Also, the flat surface may be, but is not limited to, a desk, a table, a shelf, or the ground.

Throughout the specification, the term "input mode" may indicate a mode when a mobile device receives a user input and analyzes an operation to be executed according to the received user input.

Throughout the specification, the term "in-hand mode" may indicate one of various types of input modes of a mobile device when the mobile device is held by a user.

Throughout the specification, the term "on-surface mode" may indicate one of various types of input modes of a mobile device when the mobile device is placed on a flat surface.

Throughout the specification, when an input mode is changed, a unit for receiving a user input with respect to a mobile device and an operation that corresponds to the user input are changed. For example, when an input mode of the mobile device is changed, some sensors in the mobile device may be activated or deactivated in order to receive the user input. As another example, the mobile device may differently interpret one user input according to input modes, and may execute different operations according to the input modes.

Throughout the specification, the term "hitting input" may indicate an input that occurs when a user hits a flat surface. A mobile device may sense at least one of a vibration and a sound that are generated when the user hits the flat surface, and thus, the mobile device may receive the hitting input.

Throughout the specification, the term "tilting input" may indicate an input that occurs when a mobile device is placed on a flat surface so that a portion of the mobile device is spaced apart from the flat surface.

Throughout the specification, the term "bezel input" may indicate an input that occurs when a user touches a bezel portion of a mobile device. The bezel portion of the mobile device may indicate a side portion of the mobile device, e.g., an edge portion of the mobile device.

Throughout the specification, the term "object" may indicate at least one of an image, a video, and a text displayed on a screen of a mobile device. The object may include, but is not limited to, a user interface, an execution result of an application, an execution result of content, a content list, or an icon.

As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described more fully with reference to the accompanying drawings.

FIG. 1 illustrates an example in which a mobile device 1000 placed on a flat surface receives a user input, according to an exemplary embodiment.

As illustrated in FIG. 1, the mobile device 1000 may be placed on the flat surface. The mobile device 1000 that is placed on the flat surface may operate during an on-surface input mode. Also, the mobile device 1000 may receive a user input during the on-surface input mode. For example, the user input may include a tilting input, a bezel input, a hitting input, or a sliding input. When a sliding input is applied, the user slides the mobile device 1000 on the flat surface.

The mobile device 1000 placed on the flat surface may execute a preset operation that corresponds to the user input. For example, the mobile device 1000 may be activated, may execute a preset application, may perform a preset function of an application, or may change an object displayed on a screen thereof according to the user input.

Figure 2:
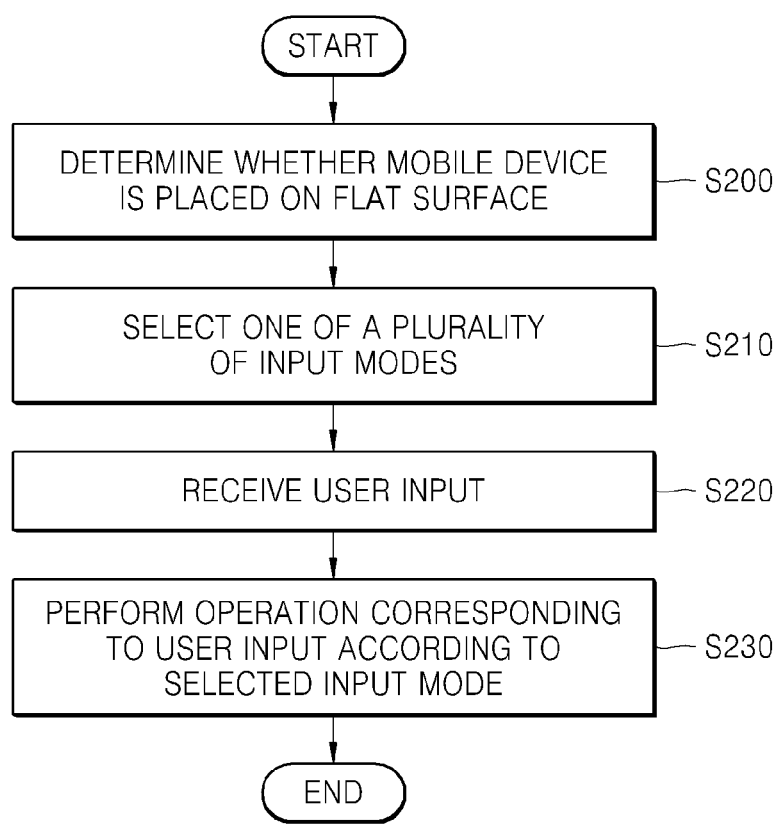
FIG. 2 is a flowchart of a method of executing an operation according to a user input, the method being performed by a mobile device in an on-surface mode, according to an exemplary embodiment.

FIG. 2 is a flowchart of a method of executing an operation according to a user input, the method being performed by the mobile device 1000 during an on-surface mode, according to an exemplary embodiment.

In operation S200, the mobile device 1000 determines whether the mobile device 1000 is placed on a flat surface by using a sensor included in the structure thereof. The sensor may include at least one of a vibration sensor, a gyro sensor, an acceleration sensor, a pressure sensor, a gravity sensor, and a touch sensor. The mobile device 1000 may sense shaking of the mobile device 1000 by using the sensor, and when a shaking level is equal to or less than a preset value, the mobile device 1000 may determine that the mobile device 1000 is placed on the flat surface.

The mobile device 1000 may determine whether the mobile device 1000 is placed on the surface by using a camera of the mobile device 1000. For example, if a brightness of an image captured by using a rear side camera of the mobile device 1000 is equal to or less than a preset value, and a brightness of an image captured by using a front side camera of the mobile device 1000 is equal to or higher than the preset value, the mobile device 1000 may determine that the mobile device 1000 is placed on the flat surface (e.g., plate) with a rear side thereof facing the flat surface. As another example, if the brightness of the image captured by using the rear side camera of the mobile device 1000 is greater than the preset value, and the brightness of the image captured by using the front side camera of the mobile device 1000 is less than the preset value, the mobile device 1000 may determine that the mobile device 1000 is placed with a front side thereof facing the flat surface.

In operation S210, the mobile device 1000 selects one input mode among a plurality of input modes. The input modes may include an on-hand mode and an on-surface mode. The on-hand mode is one of the input modes of the mobile device 1000, during which the mobile device 1000 is held by the user. Also, the on-surface mode is one of the input modes of the mobile device 1000, during which the mobile device 1000 is placed on the flat surface.

For example, when the mobile device 1000 that is held by the user is placed on the flat surface, the mobile device 1000 may select the on-surface mode. As another example, when the mobile device 1000 that is placed on the flat surface is activated, the mobile device 1000 may select the on-surface mode.

When the user holds the mobile device 1000, the mobile device 1000 may select the on-hand mode.

In operation S230, the mobile device 1000 receives a user input. The mobile device 1000 may receive the user input by using various sensors in the mobile device 1000.

The mobile device 1000 may receive a hitting input from the user. The mobile device 1000 may sense a vibration that is generated when the user hits the flat surface, by using the vibration sensor. Also, the mobile device 1000 may sense a sound that is generated when the user hits the flat surface, by using a microphone. Also, the mobile device 1000 may determine a location or a direction of a place where the vibration is generated, by using the vibration sensor. Also, the mobile device 1000 may determine a location or a direction of a place where the sound is generated, by using the microphone. The mobile device 1000 may determine in which direction of right, left, up, and down directions of the mobile device 1000 the user hits the flat surface.

The mobile device 1000 may receive a tilting input from the user. The mobile device 1000 may determine whether a portion of the mobile device 1000 is spaced apart from the flat surface, by using a sensor in the structure thereof. As described above, the sensor may include at least one of the vibration sensor, the gyro sensor, the acceleration sensor, the pressure sensor, the gravity sensor, and the touch sensor.

The mobile device 1000 may receive a bezel input from the user. For example, a touch sensor may be arranged in a bezel portion of the mobile device 1000, and the mobile device 1000 may receive the bezel input by using the touch sensor arranged in the bezel portion.

When the mobile device 1000 is moved on the flat surface, the mobile device 1000 may determine a moved location of the mobile device 1000. Also, when a direction of the mobile device 1000 is changed on the flat surface, the mobile device 1000 may determine a changed direction of the mobile device 1000.

Also, when the user holds the mobile device 1000, the mobile device 1000 may sense a movement of the mobile device 1000.

In operation S240, the mobile device 1000 executes an operation that corresponds to the user input, according to the selected input mode. If the mobile device 1000 is placed on the flat surface, the mobile device 1000 may execute the operation corresponding to the user input during the on-surface mode. The operation by the mobile device 1000 may include an operation of activating the mobile device 1000, an operation of executing a preset application, an operation of performing a preset function of an application, or an operation of changing an object displayed on a screen of the mobile device 1000. Also, operations by the mobile device 1000 may be matched with a hitting input, a tilting input, a bezel input, an input of moving the mobile device 1000 on the flat surface, and an input of changing a direction of the mobile device 1000 on the flat surface, respectively.

Figure 3:
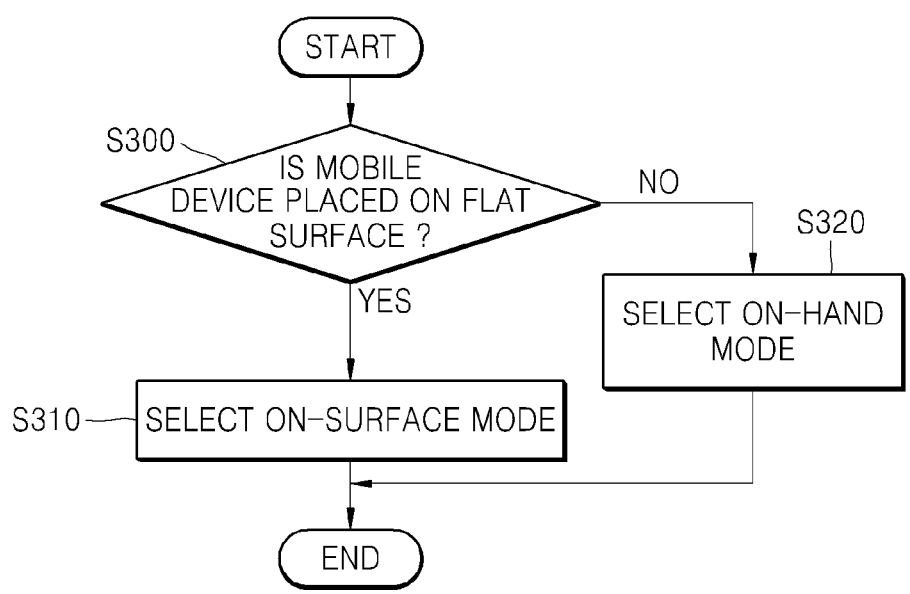
FIG. 3 is a flowchart of a method of selecting an input mode, the method being performed by a mobile device, according to an exemplary embodiment.

FIG. 3 is a flowchart of a method of selecting an input mode, the method being performed by the mobile device 1000, according to an exemplary embodiment.

In operation S300, the mobile device 1000 determines whether the mobile device 1000 is placed on a flat surface. The mobile device 1000 may determine whether the mobile device 1000 is placed on the flat surface by using a sensor in the structure thereof. The sensor may include at least one of a vibration sensor, a gyro sensor, an acceleration sensor, a pressure sensor, a gravity sensor, and a touch sensor. The mobile device 1000 may sense shaking thereof by using the sensor, and when a shaking level is equal to or less than a preset value, the mobile device 1000 may determine that the mobile device 1000 is placed on the flat surface. Also, for example, the touch sensor or the pressure sensor may be arranged in a front edge portion and a rear edge portion of the mobile device 1000, and based on a sensed value obtained by the touch sensor or the pressure sensor, the mobile device 1000 may determine whether the mobile device 1000 is placed on the flat surface.

The mobile device 1000 may determine whether the mobile device 1000 is placed on the flat surface, by using a camera in the structure thereof. For example, if a brightness of an image captured by using a rear side camera of the mobile device 1000 is equal to or less than a preset value, and a brightness of an image captured by using a front side camera of the mobile device 1000 is equal to or higher than the preset value, the mobile device 1000 may determine that the mobile device 1000 is placed on the flat surface with a screen thereof exposed to the outside. As another example, if the brightness of the image captured by using the rear side camera of the mobile device 1000 is greater than the preset value, and the brightness of the image captured by using the front side camera of the mobile device 1000 is less than the preset value, the mobile device 1000 may determine that the mobile device 1000 is placed on the flat surface with the screen thereof not exposed to the outside. Also, the mobile device 1000 may sense, by using the camera, how the mobile device 1000 is placed on the flat surface so as to determine whether a front surface thereof faces the flat surface or a rear surface thereof faces the flat surface.

As a result of the determination in operation S300, when the mobile device 1000 determines that that the mobile device 1000 is placed on the flat surface, in operation S310, the mobile device 1000 selects an on-surface mode. During the on-surface mode, the mobile device 1000 may receive a hitting input, a tilting input, a bezel input, an input of touching the screen thereof, an input of moving the mobile device 1000 on the flat surface, or an input of changing a direction of the mobile device 1000 on the flat surface. Also, during the on-surface mode, the mobile device 1000 may display a preset user interface that corresponds to the on-surface mode on the screen thereof.

As a result of the determination in operation S300, when the mobile device 1000 determines that the mobile device 1000 is not placed on the flat surface, in operation S320, the mobile device 1000 selects an on-hand mode. During the on-hand mode, the mobile device 1000 may receive an input of touching the screen thereof, an input of touching a bezel thereof, or a moving input. Also, during the on-hand mode, the mobile device 1000 may display a preset user interface that corresponds to the on-hand mode on the screen thereof.

Figure 4:
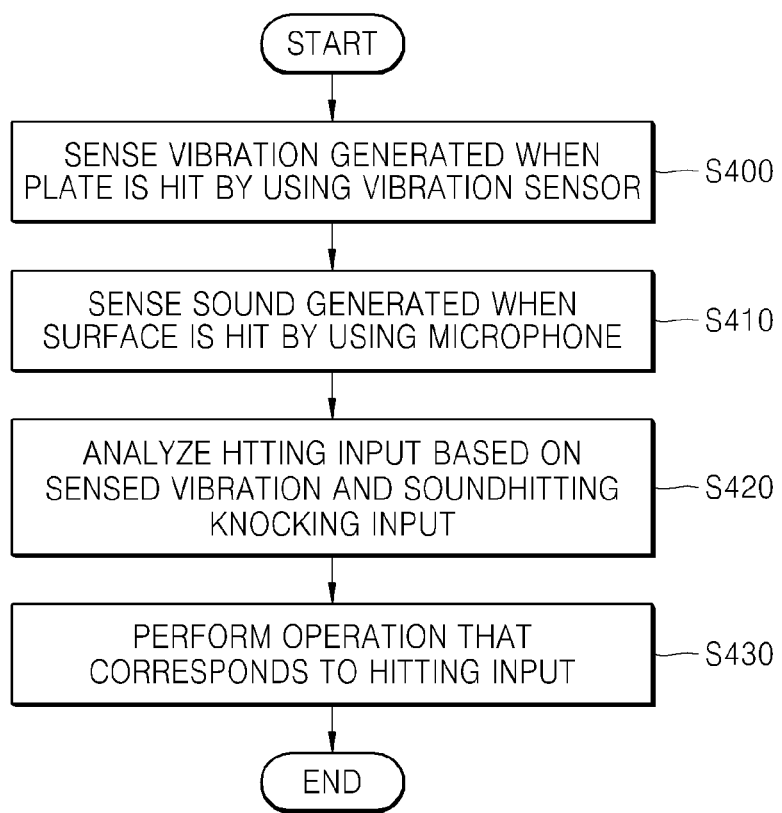
FIG. 4 is a flowchart of a method of executing an operation that corresponds to a knocking input, the method being performed by the mobile device during an on-surface mode, according to an exemplary embodiment.

FIG. 4 is a flowchart of a method of executing an operation that corresponds to a hitting input, the method being performed by the mobile device 1000 during an on-surface mode, according to an exemplary embodiment.

In operation S400, the mobile device 1000 senses a vibration that is generated when a user hits the flat surface, by using a vibration sensor. When the user hits the flat surface, a vibration may be generated by the flat surface, so that the mobile device 1000 may sense the generated vibration by using the vibration sensor in the structure thereof.

In operation S410, the mobile device 1000 may sense a sound that is generated when the user hits the flat surface, by using a microphone. When the user hits the flat surface, a sound may be generated in the vicinity of the flat surface and the mobile device 1000 may sense the generated sound by using the microphone in the structure thereof.

In operation S420, the mobile device 1000 may analyze a hitting input, based on the sensed vibration and sound. The mobile device 1000 may determine a location, a direction, and the number of times that the user hits the plate, based on at least one of the vibration and the sound. If the user hits the plate several times, the mobile device 1000 may determine a hitting pattern. The hitting patterns may differ from each other according to the number of times and a time interval when the user hits the plate.

For example, the mobile device 1000 may determine the side thereof, that is, the right, left, top, or bottom side, where the vibration that is sensed by the vibration sensor is generated. To do so, the mobile device 1000 may include a plurality of vibration sensors, and based on amplitudes of vibrations that are respectively sensed by the vibration sensors, the mobile device 1000 may determine the location where the vibration is generated. As another example, the mobile device 1000 may determine on which side thereof, that is, the right, left, top, or bottom side, the vibration that is sensed by the microphone is generated. To do so, the mobile device 1000 may include a plurality of microphones, and based on strengths of sounds that are respectively sensed by the microphones, the mobile device 1000 may determine the location where the vibration is generated.

The mobile device 1000 may determine a location where a sound is generated by using a microphone array in the structure thereof. To do so, a plurality of microphones may be disposed at a preset interval at preset locations in the structure of the mobile device 1000. For example, four microphones may be respectively disposed at vertices of side edges of the mobile device 1000. As another example, four microphones may be disposed so that a virtual line that connects the four microphones may form a rectangle, a square, or a rhombus. As another example, a plurality of microphones may be disposed in the mobile device 1000 in a circle shape. However, one or more exemplary embodiments are not limited thereto.

The microphones included in the mobile device 1000 may be directional microphones. In this case, the directional microphones may be disposed to respectively face the side edges of the mobile device 1000.

Also, each of the microphones included in the mobile device 1000 may sense a sound (a hitting sound) that is generated when the user hits the flat surface. Also, the microphones included in the mobile device 1000 may generate audio signals that respectively indicate the sensed sounds.

The mobile device 1000 may compare the audio signals generated by the microphones, and thus may determine a location of the sound (the hitting sound) that is generated when the user hits the flat surface. For example, the mobile device 1000 may compare times when the hitting sounds are respectively sensed by the microphones. As another example, the mobile device 1000 may compare waveforms and strengths of the audio signals that are respectively generated by the microphones. The mobile device 1000 may determine the location or a direction of the hitting sound, based on the comparison result and locations of the microphones.

In operation S430, the mobile device 1000 performs an operation that corresponds to the hitting input. The mobile device 1000 may perform a preset operation based on at least one of the location, the direction, and the hitting pattern of the hitting input. The preset operation may include, but is not limited to, an operation of activating the mobile device 1000, an operation of executing a preset application, an operation of performing a preset function of an application, or an operation of changing an object displayed on a screen of the mobile device 1000.

Figure 5:
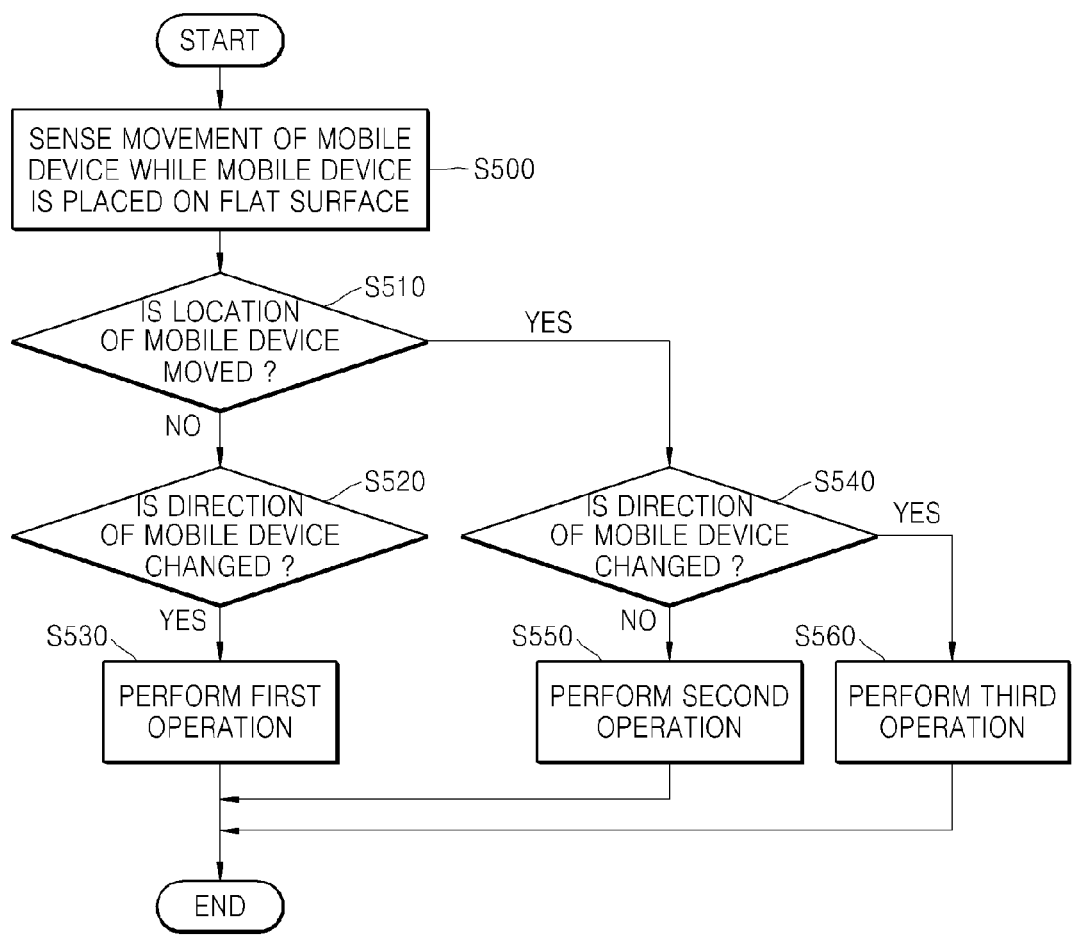
FIG. 5 is a flowchart of a method of performing a preset operation when the mobile device is moved on a flat surface or a direction of the mobile device is changed on the flat surface, the method being performed by the mobile device, according to an exemplary embodiment.

FIG. 5 is a flowchart of a method of performing a preset operation when the mobile device 1000 is moved on a flat surface or a direction of the mobile device 1000 is changed on the flat surface, the method being performed by the mobile device 1000, according to an exemplary embodiment.

In operation S500, the mobile device 1000 senses a movement thereof while the mobile device 1000 is placed on the flat surface. The mobile device 1000 may sense the movement thereof by using at least one of a vibration sensor, a gyro sensor, an acceleration sensor, and a pressure sensor. The mobile device 1000 may move while being slid on the flat surface. Also, the user may lift up the mobile device 1000 from the flat surface and then put the mobile device 1000 down on the flat surface.

In operation S510, the mobile device 1000 determines whether the mobile device 1000 has been moved. The mobile device 1000 may move while being slid on the flat surface. Also, the mobile device 1000 may be moved when the user pushes or hits a bezel portion of the mobile device 1000 place on the flat surface. Alternatively, the mobile device 1000 may be moved when the user lifts the mobile device 1000 up from the flat surface and then puts the mobile device 1000 down at another location of the flat surface. The mobile device 1000 may determine the moving manner. If a movement distance of the mobile device 1000 is equal to or less than a preset value, the mobile device 1000 may determine that the mobile device 1000 has not been moved on the flat surface, and if the movement distance of the mobile device 1000 is greater than the preset value, the mobile device 1000 may determine that the mobile device 1000 has been moved on the flat surface.

As a result of the determination in operation S510, when the mobile device 1000 determines that the mobile device 1000 has not been moved, in operation S520, the mobile device 1000 determines whether a direction thereof has been changed.

Since the mobile device 1000 slides on the flat surface, the direction of the mobile device 1000 may be changed. For example, when the user pushes or hits the bezel portion of the mobile device 1000 on the flat surface, the direction of the mobile device 1000 may be changed. As another example, when the user lifts up the mobile device 1000 from the flat surface, changes the direction of the mobile device 1000, and then puts the mobile device 1000 down on the flat surface, the direction of the mobile device 1000 may be changed. The mobile device 1000 may determine the manner of changing its direction.

As a result of the determination in operation S520, when the mobile device 1000 determines that the direction thereof has been changed, in operation S530, the mobile device 1000 performs a first operation. For example, when the mobile device 1000 reproduces a music file and is rotated in a clockwise direction on the flat surface, the mobile device 1000 may increase a sound volume of the mobile device 1000. Also, when the mobile device 1000 reproduces a music file and is rotated in a counterclockwise direction on the flat surface, the mobile device 1000 may decrease the sound volume of the mobile device 1000.

As the result of the determination in operation S510, when the mobile device 1000 determines that the mobile device 1000 has been moved, in operation S540, the mobile device 1000 determines whether the direction thereof has been changed.

In operation S540, when the mobile device 1000 determines that the direction thereof has not been changed, in operation S550, the mobile device 1000 performs a second operation. For example, when a photo is displayed on the screen of the mobile device 1000, and the mobile device 1000 is moved in a right direction, the mobile device 1000 may display a next photo of the displayed photo on the screen.

In operation S540, when the mobile device 1000 determines that the direction thereof has been changed, in operation S560, the mobile device 1000 performs a third operation. The third operation may include the first operation and the second operation, but is not limited thereto. The third operation may be different from the first and second operations.

The first, second, and third operations may be previously set according to a status of the mobile device 1000, content that is currently executed by the mobile device 1000, an application that is currently executed by the mobile device 1000, or an object that is displayed on the mobile device 1000.

Figure 6:
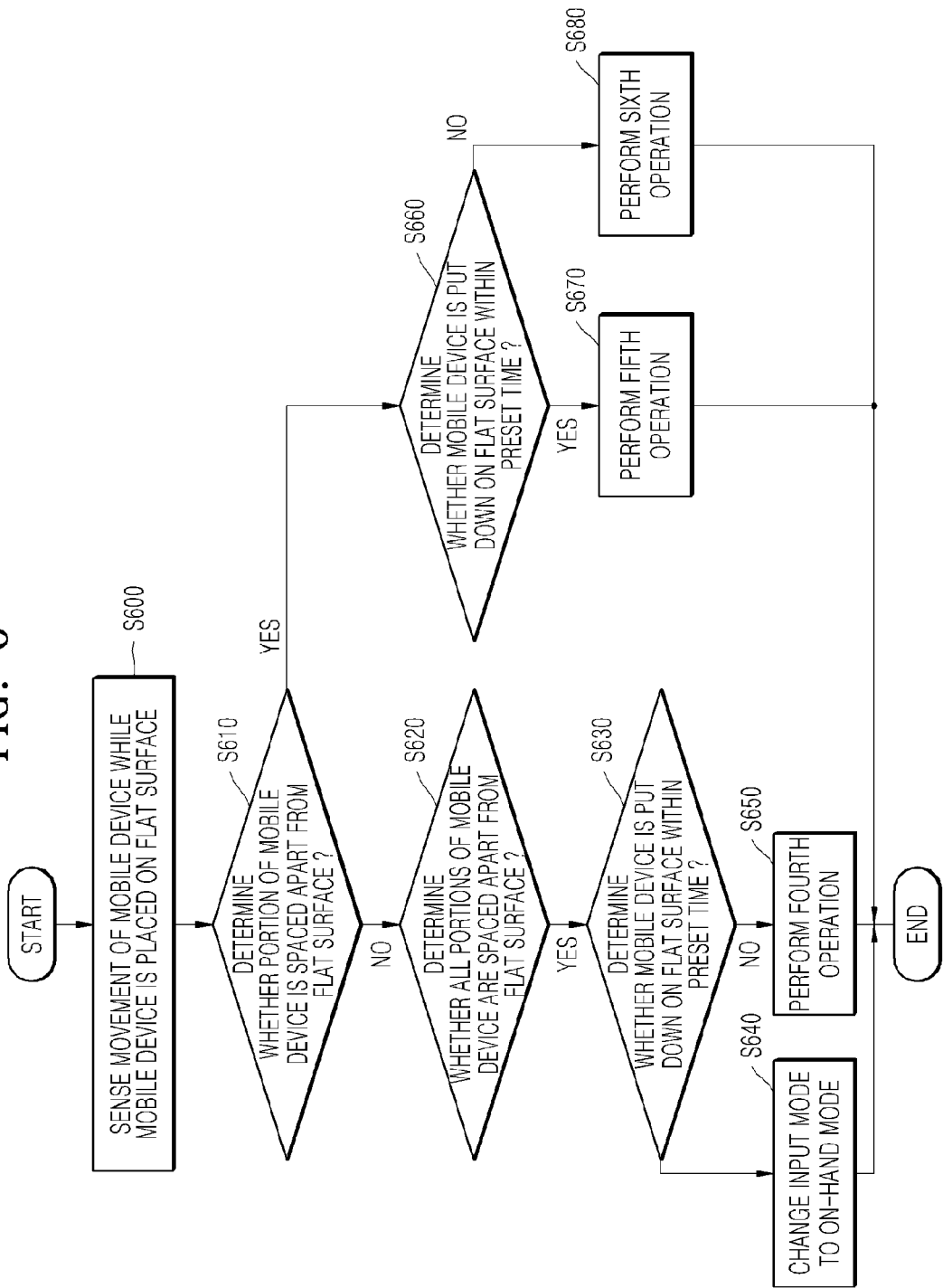
FIG. 6 is a flowchart of a method of performing a preset operation when the mobile device or a portion of the mobile device is spaced apart from a flat surface, the method being performed by the mobile device, according to an exemplary embodiment.

FIG. 6 is a flowchart of a method of performing a preset operation as the mobile device 1000 or a portion thereof is spaced apart from a flat surface, the method being performed by the mobile device 1000, according to an exemplary embodiment. Referring to FIG. 6, the mobile device 1000 may perform the preset operation according to a tilting input received from a user or an input of the user who lifts up the mobile device 1000 and then puts the mobile device 1000 down on the flat surface.

In operation S600, the mobile device 1000 senses a movement thereof while the mobile device 1000 is placed on the flat surface. The mobile device 1000 may sense the movement thereof by using at least one of a vibration sensor, a gyro sensor, an acceleration sensor, and a pressure sensor.

In operation S610, the mobile device 1000 determines whether the portion thereof is spaced apart from the flat surface. The mobile device 1000 may determine whether the portion thereof is spaced apart from the flat surface, and another portion of the mobile device 1000 contacts the flat surface.

As a result of the determination in operation S610, if the portion of the mobile device 1000 is not spaced apart from the flat surface, in operation S620, the mobile device 1000 determines whether all portions thereof are spaced apart from the flat surface.

As a result of the determination in operation S620, if all portions of the mobile device 1000 are spaced apart from the flat surface, in operation S630, the mobile device 1000 determines whether the mobile device 1000 is put down on the flat surface within a preset time.

As a result of the determination in operation S630, if the mobile device 1000 is not put down on the flat surface within the preset time, in operation S640, the mobile device 1000 changes its input mode to an on-hand mode.

However, as the result of the determination in operation S630, if the mobile device 1000 is put down on the flat surface within the preset time, in operation S650, the mobile device 1000 performs a fourth operation. That is, when the user lifts up the mobile device 1000 from the flat surface and then puts the mobile device 1000 back on the flat surface within the preset time, the mobile device 1000 may perform the fourth operation.

As the result of the determination in operation S610, when the mobile device 1000 determines that the portion thereof is spaced apart from the flat surface, in operation S660, the mobile device 1000 determines whether the portion of the mobile device 1000 is put down on the flat surface within a preset time.

As a result of the determination in operation S660, when the mobile device 1000 determines that the portion of the mobile device 1000 is put down on the flat surface within the preset time, in operation S670, the mobile device 1000 performs a fifth operation.

However, as the result of the determination in operation S660, when the mobile device 1000 determines that the portion of the mobile device 1000 is not put down on the flat surface within the preset time, in operation S680, the mobile device 1000 performs a sixth operation.

The fourth operation, the fifth operation, and the sixth operation may be previously set according to a status of the mobile device 1000, content that is currently executed by the mobile device 1000, an application that is currently executed by the mobile device 1000, or an object that is displayed on the mobile device 1000.

Figure 7:
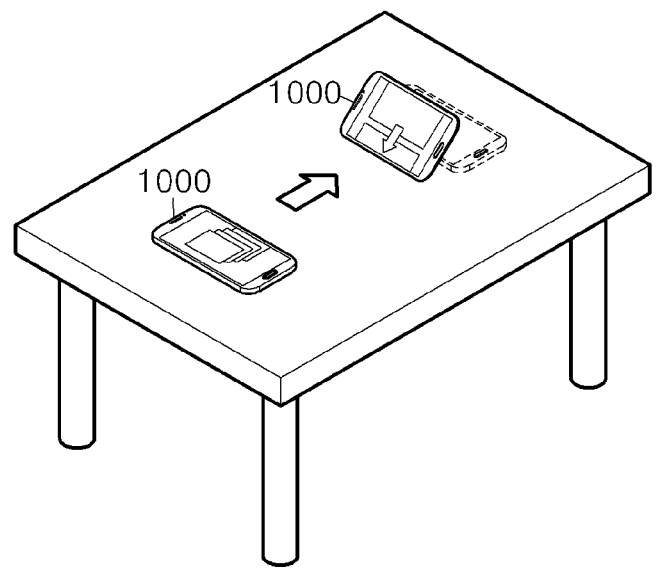
FIG. 7 illustrates an example of a tilting input, according to an exemplary embodiment.

FIG. 7 illustrates an example of a tilting input, according to an exemplary embodiment.

As illustrated in FIG. 7, when a user spaces a portion of the mobile device 1000 apart from the flat surface, the mobile device 1000 may receive a tilting input from the user. For example, when a left side edge of the mobile device 1000 from among side edges of the mobile device 1000 contacts the flat surface, and the rest of the side edges of the mobile device 1000 are spaced apart from the flat surface, the mobile device 1000 may receive a tilting input of tilting the mobile device 1000 from left to right.

As the tilting input is received, the mobile device 1000 may be activated, notification information may be displayed on a screen of the mobile device 1000, or a current time may be displayed on the screen of the mobile device 1000.

Figure 8:
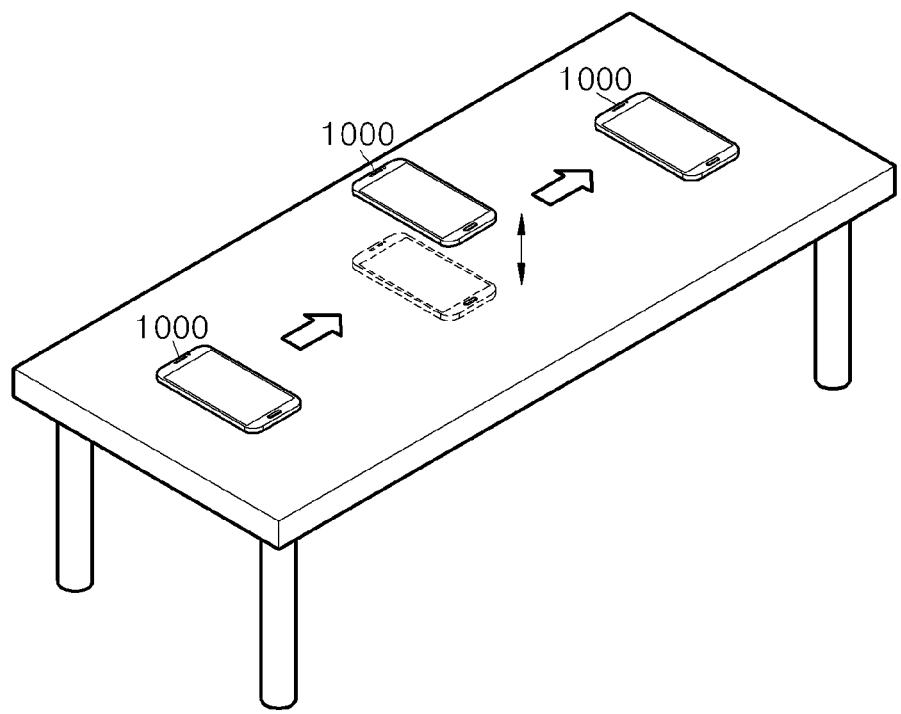
FIG. 8 illustrates an example when a user lifts up the mobile device from a flat surface and then puts the mobile device down on the flat surface, according to an exemplary embodiment.

FIG. 8 illustrates an example when a user lifts up the mobile device 1000 from a flat surface and then puts the mobile device 1000 down on the flat surface, according to an exemplary embodiment.

As illustrated in FIG. 8, the user may lift up the mobile device 1000 from the flat surface and then may put the mobile device 1000 down on the flat surface within a preset time. For example, when the mobile device 1000 is lifted up and then is put down on the flat surface, the mobile device 1000 may display a homepage of the mobile device 1000 on a screen thereof.

Figure 9:
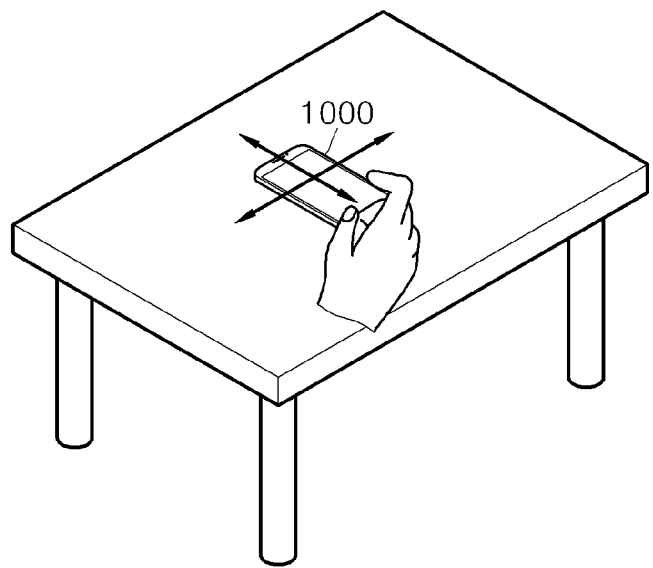
FIG. 9 illustrates an example when the mobile device is moved on a flat surface, according to an exemplary embodiment.

FIG. 9 illustrates an example when the mobile device 1000 is moved on a flat surface, according to an exemplary embodiment.

Referring to FIG. 9, a user may hold and move the mobile device 1000 in a right, left, up, or down direction of the mobile device 1000. Also, the user may hold the mobile device 1000 on the flat surface and may shake the mobile device 1000 in left and right directions or in up and down directions.

Figure 10:
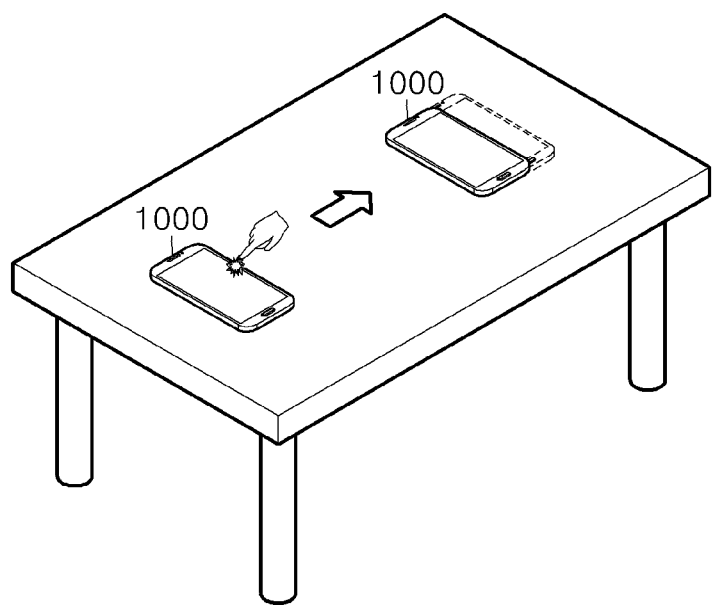
FIG. 10 illustrates an example when the mobile device is moved in response to a bezel input, according to an exemplary embodiment.

FIG. 10 illustrates an example when the mobile device 1000 is moved in response to a bezel input, according to an exemplary embodiment.

Referring to FIG. 10, when a user touches a bezel portion of the mobile device 1000, the mobile device 1000 may be moved on a flat surface. For example, the user may push or hit the bezel portion of the mobile device 1000 so that the mobile device 1000 may be moved on the flat surface.

Also, the mobile device 1000 may determine which portion thereof has been touched and in which direction the portion has been moved, and thus may perform a preset operation.

Figure 11A:
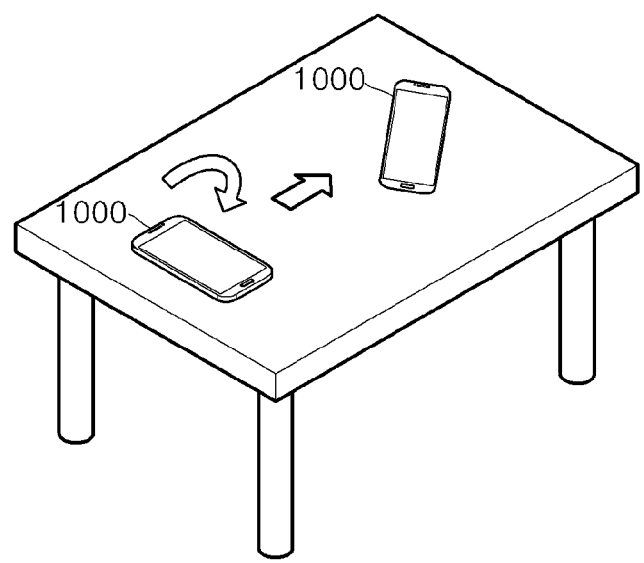
FIGS. 11A and 11B illustrate an example of an input to change a direction of the mobile device on a flat surface, according to an exemplary embodiment.
Figure 11B:
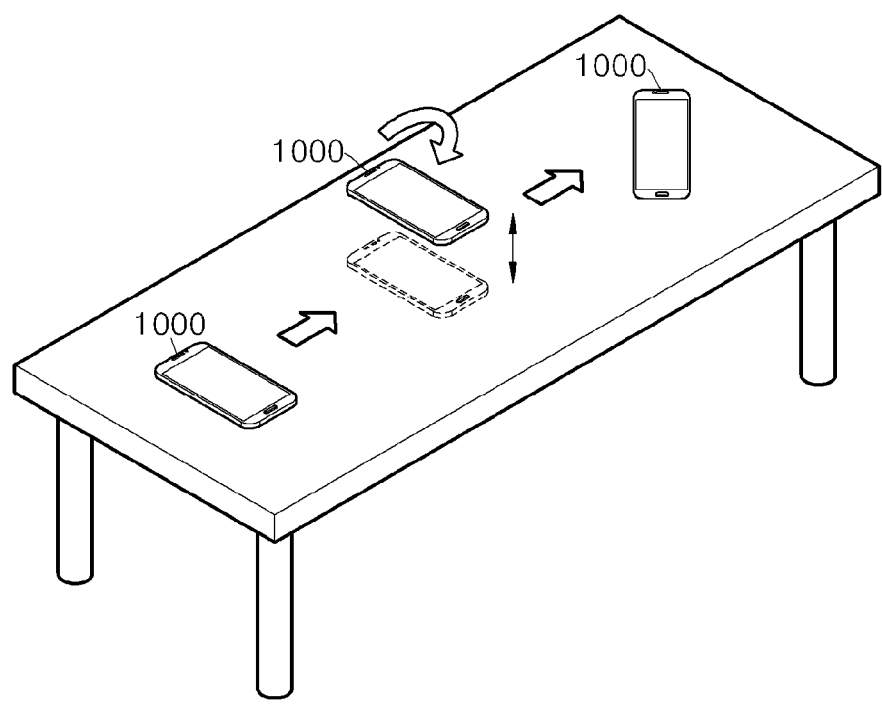

FIGS. 11A and 11B illustrates an example of an input to change a direction of the mobile device 1000 placed on a flat surface, according to an exemplary embodiment.

Referring to FIG. 11A, while the mobile device 1000 is placed on the flat surface, a user may rotate the mobile device 1000. For example, the user may rotate the mobile device 1000 by pushing or hitting a bezel portion of the mobile device 1000. As another example, the user may hold the mobile device 1000 and then may rotate the mobile device 1000.

Referring to FIG. 11B, the user may lift up the mobile device 1000 from the flat surface, may rotate the mobile device 1000, and then may put the mobile device 1000 down on the flat surface.

Figure 12:
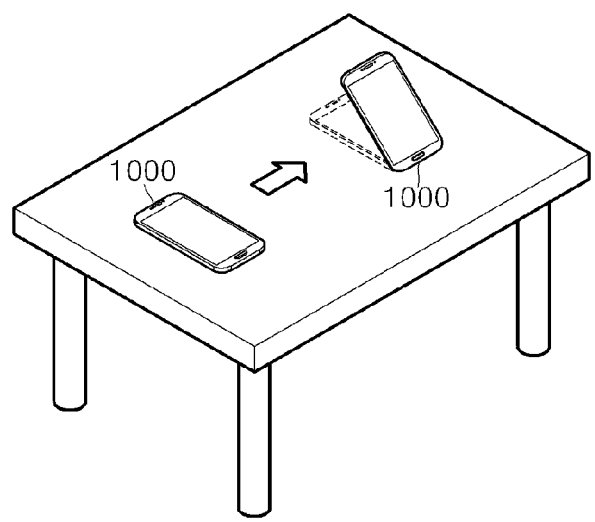
FIG. 12 illustrates an example when the mobile device stands on a flat surface, according to an exemplary embodiment.

FIG. 12 illustrates an example when the mobile device 1000 is vertically placed on a flat surface, according to an exemplary embodiment.

Referring to FIG. 12, a user may space apart a portion of the mobile device 1000 from the flat surface and may place the mobile device 1000 vertically on the flat surface. The user may incline the mobile device 1000 against other objects, but one or more exemplary embodiments are not limited thereto.

After the portion of the mobile device 1000 is spaced apart from the flat surface, if the portion of the mobile device 1000 is not put down on the flat surface within a preset time, the mobile device 1000 may determine that the mobile device 1000 is in a vertical position on the flat surface.

Figure 13:
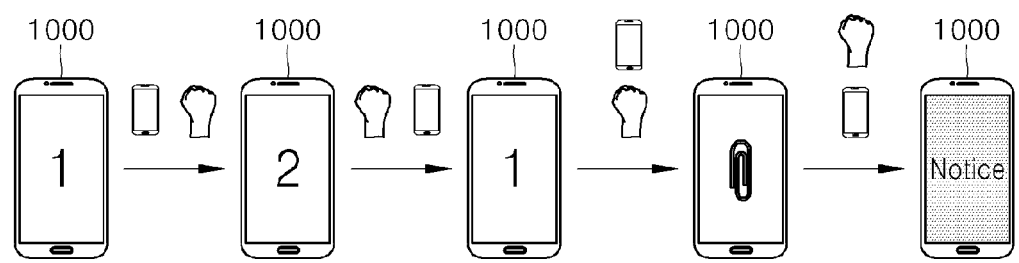
FIG. 13 illustrates an example when the mobile device executes an e-book application in response to a knocking input, according to an exemplary embodiment.

FIG. 13 illustrates an example when the mobile device 1000 executes an e-book application in response to a hitting input, according to an exemplary embodiment.

Referring to FIG. 13, while a page 1 is displayed on a screen of the mobile device 1000, if a user hits a right side of a flat surface whereon the mobile device 1000 is placed, a page 2 may be displayed on the screen of the mobile device 1000. The page 2 may be a next page following the page 1.

While the page 2 is displayed on the screen of the mobile device 1000, if the user hits a left side of the flat surface whereon the mobile device 1000 is placed, the page 1 may be displayed on the screen of the mobile device 1000.

While the page 1 is displayed on the screen of the mobile device 1000, if the user hits a lower side of the flat surface whereon the mobile device 1000 is placed, the mobile device 1000 may bookmark the page 1.

If the user hits an upper side of the flat surface whereon the mobile device 1000 is placed, notification information may be displayed. The notification information may include, but is not limited to, a notification of text message reception, a notification of message reception, or a notification of an unanswered incoming call.

Referring to FIG. 13, the page 1 and the page 2 are included in the e-book application, but one or more exemplary embodiments are not limited thereto. That is, the page 1 and the page 2 may be displayed on a web browser.

Figure 14:
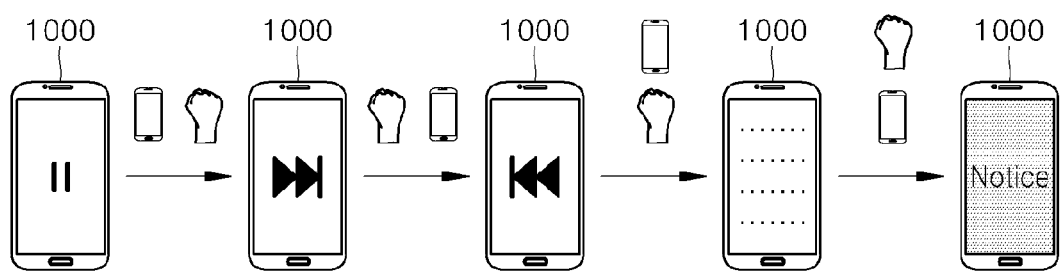
FIG. 14 illustrates an example when the mobile device performs a function of a music reproducing application in response to a knocking input, according to an exemplary embodiment.

FIG. 14 illustrates an example when the mobile device 1000 performs a function of a music reproducing application in response to a hitting input, according to an exemplary embodiment.

Referring to FIG. 14, while music is reproduced by the mobile device 1000, if a user hits a right side of a flat surface whereon the mobile device 1000 is placed, the mobile device 1000 may reproduce next music following the music that is currently reproduced.

While music is reproduced by the mobile device 1000, if the user hits a left side of the flat surface whereon the mobile device 1000 is placed, the mobile device 1000 may reproduce previous music before the music that is currently reproduced.

While music is reproduced by the mobile device 1000, if the user hits a lower side of the flat surface whereon the mobile device 1000 is placed, the mobile device 1000 may display detailed information about the music on a screen. The detailed information about the music may include a plurality of pieces of information, such as, for example, information about a music title, a reproduction time, an artist, an album, etc.

If the user hits an upper side of the flat surface whereon the mobile device 1000 is placed, notification information may be displayed on the screen.

Figure 15:
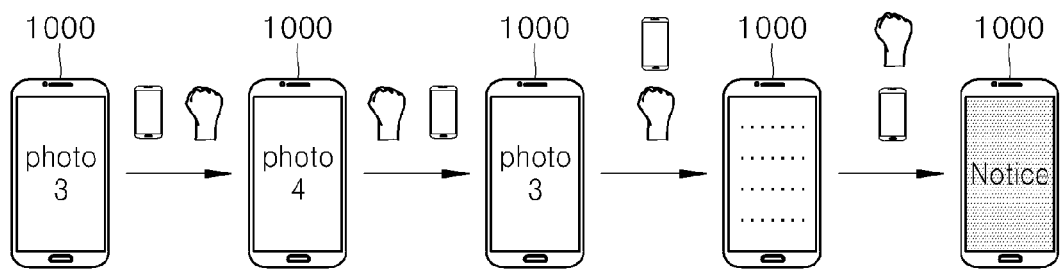
FIG. 15 illustrates an example when the mobile device performs a function of a gallery application in response to a knocking input, according to an exemplary embodiment.

FIG. 15 illustrates an example when the mobile device 1000 performs a function of a gallery application in response to a hitting input, according to an exemplary embodiment.

Referring to FIG. 15, while a photo 3 is displayed on a screen of the mobile device 1000, if a user hits a right side of a flat surface whereon the mobile device 1000 is placed, a photo 4 may be displayed on the screen of the mobile device 1000. The photo 4 may be a next photo following the photo 3.

While the photo 4 is displayed on the screen of the mobile device 1000, if the user hits a left side of the flat surface whereon the mobile device 1000 is placed, the photo 3 may be displayed on the screen of the mobile device 1000.

While the photo 3 is displayed on the screen of the mobile device 1000, if the user hits a lower side of the flat surface whereon the mobile device 1000 is placed, the mobile device 1000 may display detailed information about the photo 3. The detailed information about the photo 3 may include a time and a place where the photo 3 was photographed, and names of people included in the photo 3.

If the user hits an upper side of the flat surface whereon the mobile device 1000 is placed, notification information may be displayed on the screen.

Figure 16:
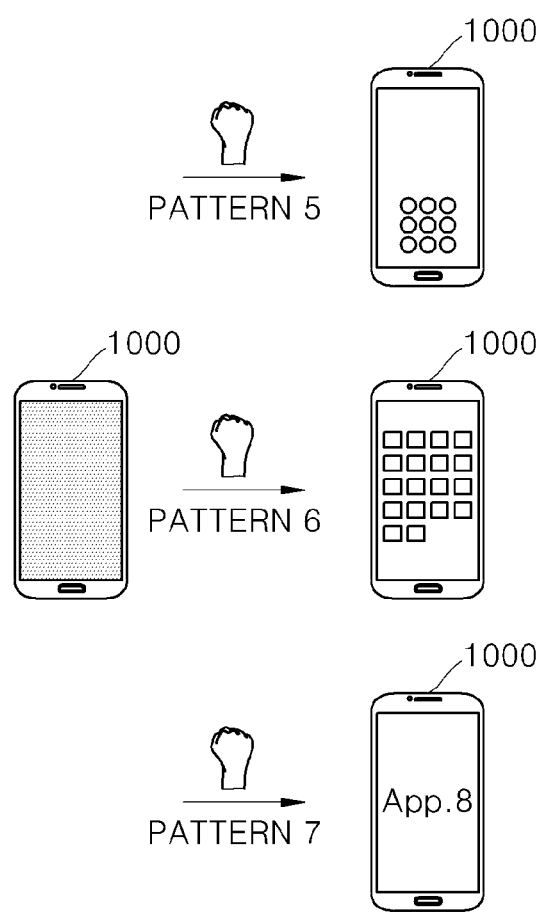
FIG. 16 illustrates an example when the mobile device operates in response to knocking inputs with different patterns, according to an exemplary embodiment.

FIG. 16 illustrates an example when the mobile device 1000 operates in response to hitting inputs with different patterns, according to an exemplary embodiment.

Referring to FIG. 16, while the mobile device 1000 is deactivated, when the mobile device 1000 receives a hitting input having a pattern 5, the mobile device 1000 may be activated, and an unlocking page may be displayed on a screen of the mobile device 1000. The deactivated status of the mobile device 1000 includes a status when the screen of the mobile device 1000 is off.

Also, while the mobile device 1000 is deactivated, when the mobile device 1000 receives a hitting input having a pattern 6, the mobile device 1000 may be activated, and a home page of the mobile device 1000 may be displayed on the screen of the mobile device 1000. Also, while the mobile device 1000 is deactivated, when the mobile device 1000 receives a hitting input having a pattern 6, the mobile device 1000 may be activated, and the mobile device 1000 may execute an application 8.

Figure 17:
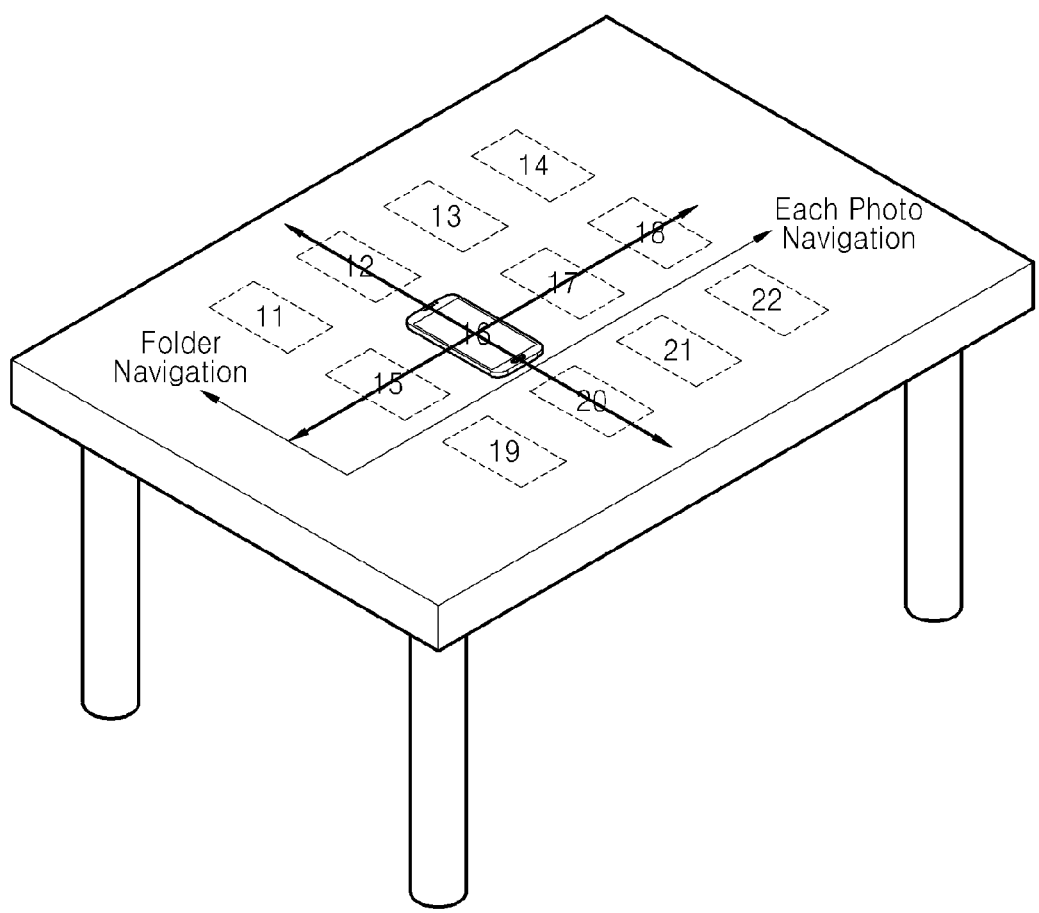
FIG. 17 illustrates an example when a photo displayed on the mobile device changes when the mobile device is moved on a flat surface, according to an exemplary embodiment.

FIG. 17 illustrates an example when a photo that is displayed on the mobile device 1000 is changed as the mobile device 1000 is moved on a flat surface, according to an exemplary embodiment.

Referring to FIG. 17, while a photo 16 is displayed on a screen of the mobile device 1000, when the mobile device 1000 is moved rightward, a photo 17 and a photo 18 may be sequentially displayed on the screen of the mobile device 1000. As the mobile device 1000 is moved rightward, the photo 16 may be intermittently or sequentially switched to the photo 17. When the photo 16 is sequentially switched to the photo 17 on the screen of the mobile device 1000, the photo 16 and the photo 17 may be co-displayed on the screen of the mobile device 1000, and then an area where the photo 17 is displayed may extend to cover a greater portion of the screen.

While the photo 16 is displayed on the screen of the mobile device 1000, when the mobile device 1000 is moved leftward, a photo 15 may be displayed on the screen of the mobile device 1000.

While the photo 16 is displayed on the screen of the mobile device 1000, when the mobile device 1000 is upwardly moved, a photo 12 may be displayed on the screen of the mobile device 1000.

While the photo 16 is displayed on the screen of the mobile device 1000, when the mobile device 1000 is downwardly moved, a photo 20 may be displayed on the screen of the mobile device 1000.

The photos 11 through 14 may be stored in a first folder of the mobile device 1000, the photos 15 through 18 may be stored in a second folder of the mobile device 1000, and the photos 19 through 22 may be stored in a third folder of the mobile device 1000.

The mobile device 1000 may also be diagonally moved or moved in other linear or non-linear directions as well.

Figure 18A:
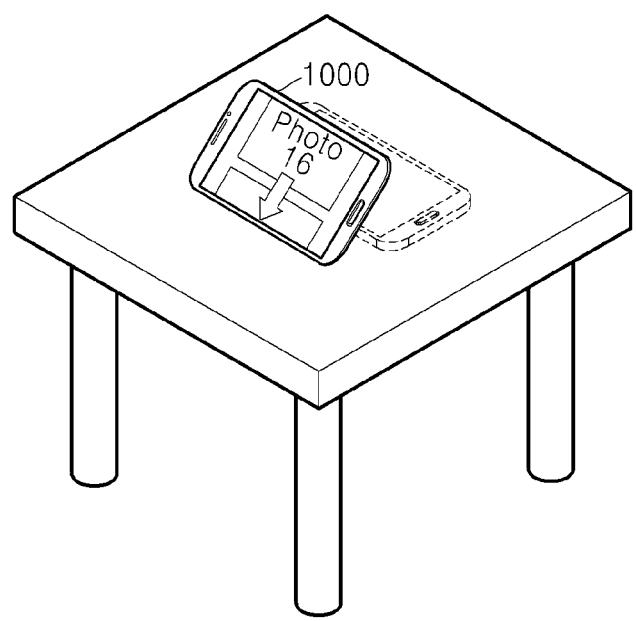
FIGS. 18A and 18B illustrate an example when a photo displayed on a screen of the mobile device changes in response to a tilting input, according to an exemplary embodiment.
Figure 18B:
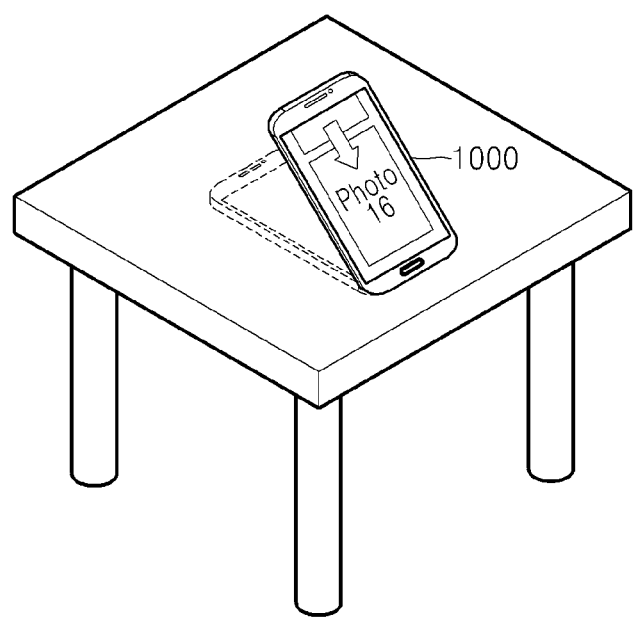

FIGS. 18A and 18B illustrate an example when a photo that is displayed on a screen of the mobile device 1000 is changed in response to a tilting input, according to an exemplary embodiment.

As illustrated in FIG. 18A, when a right portion of the mobile device 1000 is spaced apart from a flat surface, a photo 16 displayed on the screen of the mobile device 1000 may slide leftward. Also, as the photo 16 slides leftward, the photo 17 may be displayed on the screen of the mobile device 1000.

As illustrated in FIG. 18B, when a top portion of the mobile device 1000 is spaced apart from the flat surface, the photo 16 displayed on the screen of the mobile device 1000 may downwardly slide. Also, as the photo 16 downwardly slides, the photo 12 may be displayed on the screen of the mobile device 1000.

Figure 19A:
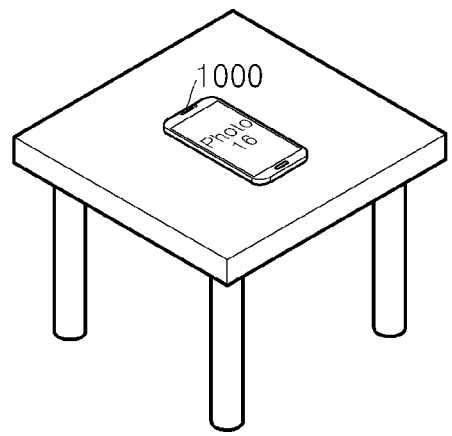
FIGS. 19A, 19B and 19C illustrate an example when a photo displayed on a screen of the mobile device changes when a location of the mobile device is changed when a user lifts up the mobile device and puts the mobile device down on a flat surface, according to an exemplary embodiment.
Figure 19B:
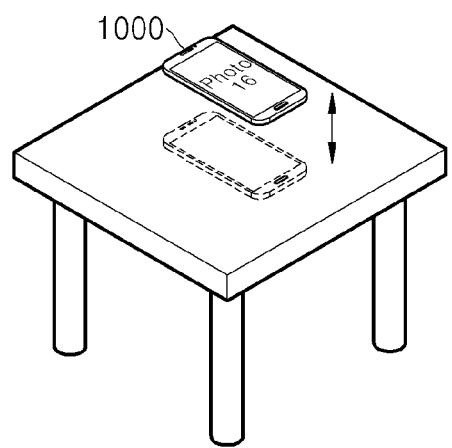
Figure 19C:
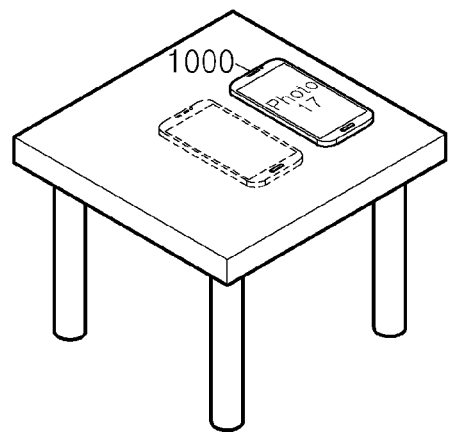

FIGS. 19A, 19B and 19C illustrate an example when a location of the mobile device 1000 is changed as a user lifts up the mobile device 1000 and puts the mobile device 1000 down on a flat surface and a photo displayed on a screen of the mobile device 1000 is changed, according to an exemplary embodiment.

Referring to FIG. 19A, a photo 16 may be displayed on the screen of the mobile device 1000 that is placed on the flat surface. As illustrated in FIGS. 19B and 19C, the user may lift up the mobile device 1000 with the photo 16 displayed thereon and then may put down the mobile device 1000 at a point on the flat surface which is located to the right with respect to a location where the mobile device 1000 was placed. Accordingly, a photo 17 may be displayed on the screen of the mobile device 1000.

FIGS. 20A, 20B, 20C and 20D illustrate an example when the mobile device 1000 is activated, according to an exemplary embodiment.

Figure 20A:
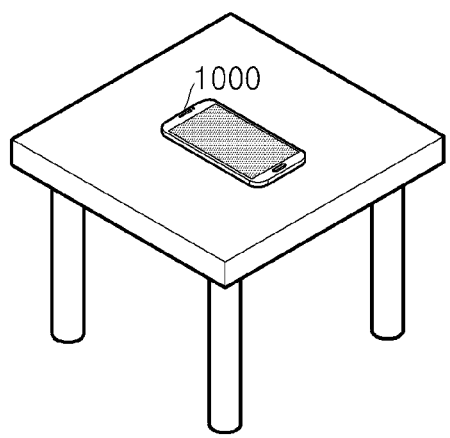
FIGS. 20A, 20B, 20C and 20D illustrate an example when the mobile device is activated, according to an exemplary embodiment.
Figure 20B:
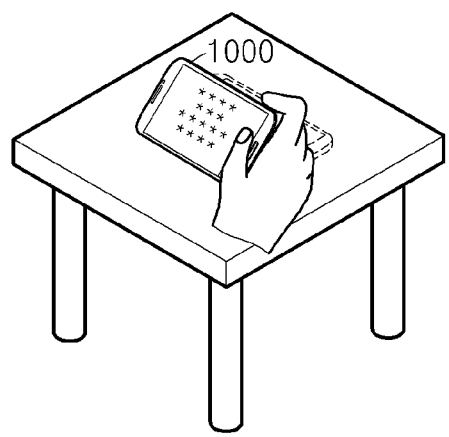

Referring to FIGS. 20A and 20B, while a screen of the mobile device 1000 is turned off, when the mobile device 1000 receives a tilting input from a user, the screen of the mobile device 1000 may be activated and notification information may be displayed on the screen of the mobile device 1000.

Figure 20C:
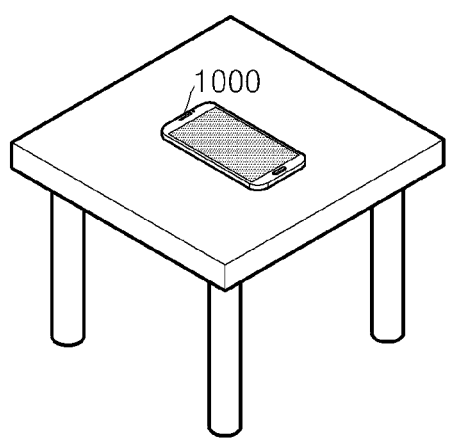

Afterward, as illustrated in FIG. 20C, when the user puts the mobile device 1000 down on the flat surface, the screen of the mobile device 1000 may be turned off.

Figure 20D:

Afterward, as illustrated in FIG. 20D, when the user lifts up the mobile device 1000, the screen of the mobile device 1000 may be activated, and the mobile device 1000 may be unlocked. Also, a homepage of the mobile device 1000 may be displayed on the screen of the mobile device 1000.

Figure 21:
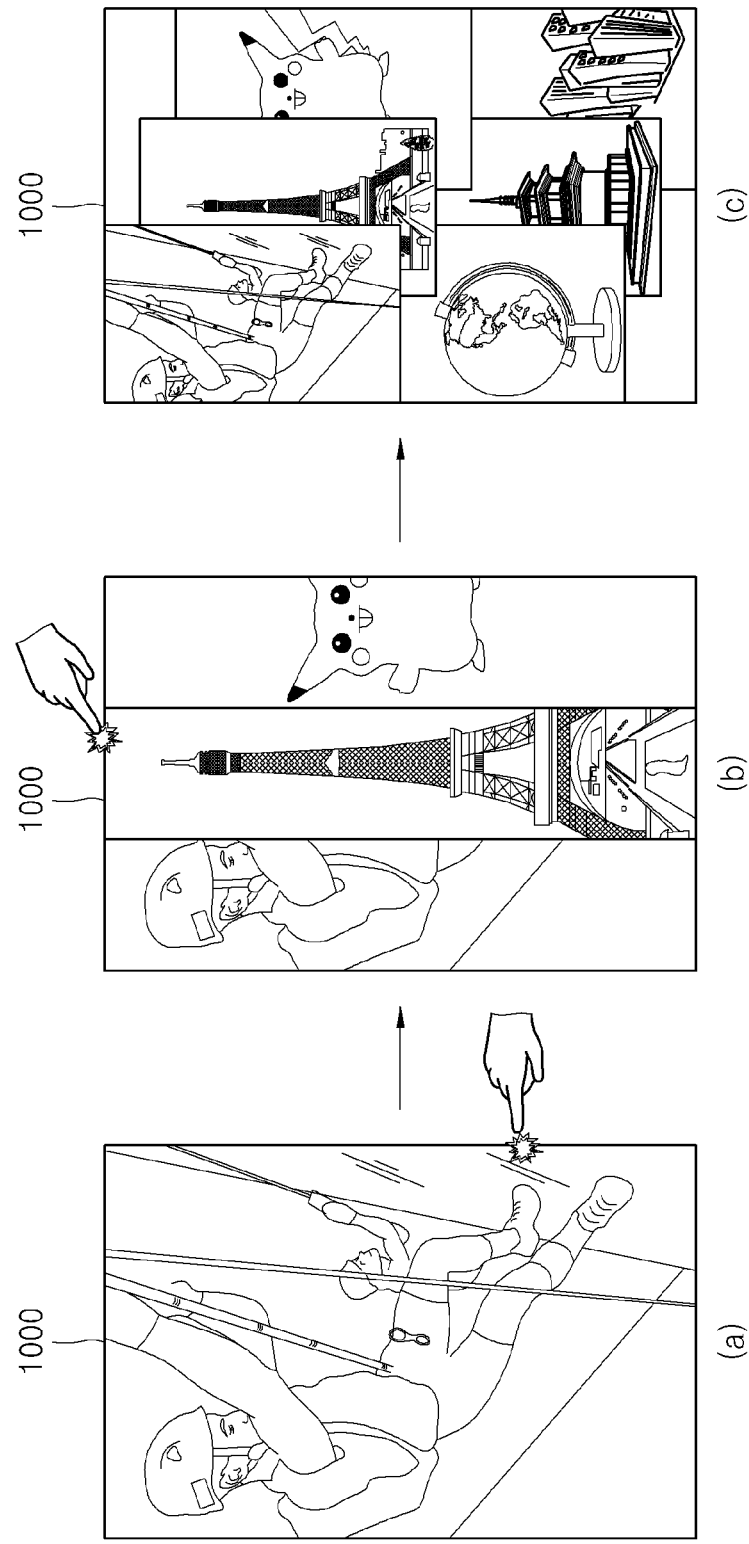
FIG. 21 illustrates an example when a screen of the mobile device is divided into a plurality of areas in response to a bezel input, and a plurality of photos are displayed in the plurality of divided areas, according to an exemplary embodiment.

FIG. 21 illustrates an example when a screen of the mobile device 1000 is divided into a plurality of areas in response to a bezel input, and a plurality of photos are displayed on the plurality of divided areas, according to an exemplary embodiment.

As illustrated in (a) of FIG. 21, while one photo is displayed on the screen of the mobile device 1000 that is placed on a flat surface, a user may touch a right portion of a bezel of the mobile device 1000.

Accordingly, as illustrated in (b) of FIG. 22, the screen of the mobile device 1000 may be divided into a plurality of areas by using vertical boundary lines. A plurality of photos may be displayed in the plurality of divided areas. Also, respective portions of the respective photos may be displayed in the plurality of divided areas.

As illustrated in (b) of FIG. 22, the user may touch a top portion of the bezel of the mobile device 1000.

Accordingly, as illustrated in (c) of FIG. 21, the divided areas of the screen of the mobile device 1000 may be further divided by using horizontal boundary lines. A plurality of photos may be displayed in the plurality of further divided areas. Also, respective portions of the respective photos may be displayed in the plurality of further divided areas.

FIG. 22 illustrates an example when another object related to an object that is displayed on a screen of the mobile device 1000 is displayed on the screen of the mobile device 1000 in response to a bezel input, according to an exemplary embodiment of the present invention.

As illustrated in (a) of FIG. 22, while a photo is displayed on a screen of the mobile device 1000 that is placed on a flat surface, a user may touch a bezel of the mobile device 1000. Accordingly, the mobile device 1000 may display other photos that include a person who is included in the photo displayed on the screen of the mobile device 1000. In this case, the mobile device 1000 may extract an image of the person from the photo that is displayed on the screen of the mobile device 1000, and thus may obtain the other photos including the person who is included in the photo. Alternatively, the mobile device 1000 may obtain the other photos including the person who is included in the photo by using metadata of the photo displayed on the screen of the mobile device 1000.

Referring to (b) of FIG. 22, while the mobile device 1000 on the flat surface reproduces music, and an album image related to the music is displayed on the screen of the mobile device 1000, the user may touch the bezel of the mobile device 1000. Accordingly, images of other albums by an artist who composed the reproduced music may be displayed on the screen of the mobile device 1000.

Figure 23A:
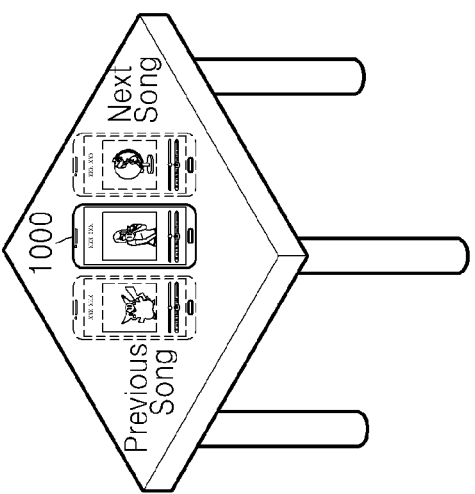
FIGS. 23A, 23B and 23C illustrate an example when, while music is reproduced on the mobile device placed on a flat surface, the mobile device operates in response to user inputs, according to an exemplary embodiment.
Figure 23B:
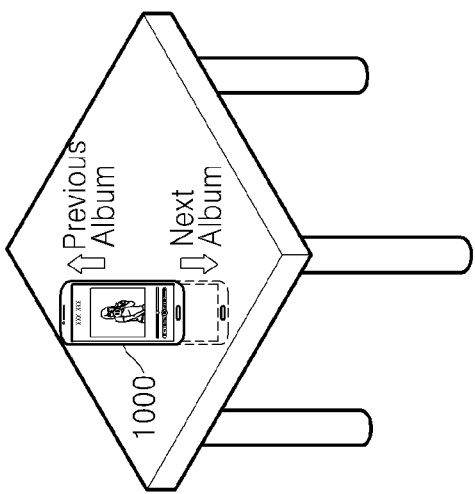
Figure 23C:
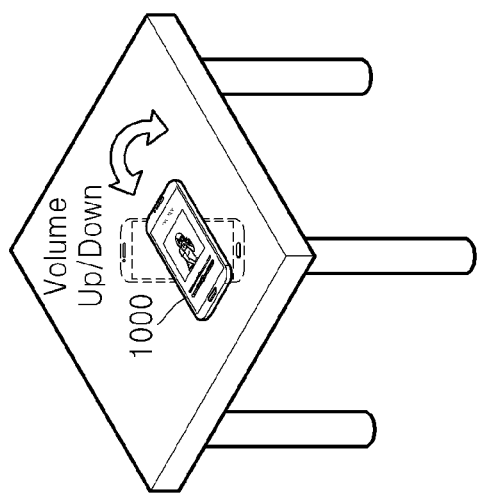

FIGS. 23A, 23B and 23C illustrate an example when, while the mobile device 1000 that is placed on a flat surface reproduces music, the mobile device 1000 operates in response to user inputs, according to an exemplary embodiment.

Referring to FIG. 23A, while the mobile device 1000 placed on the flat surface reproduces music, when the mobile device 1000 is rotated in a clockwise direction, a sound volume may be increased. Also, when the mobile device 1000 is rotated in a counterclockwise direction, the sound volume may be decreased.

Referring to FIG. 23B, while the mobile device 1000 placed on the flat surface reproduces music, the mobile device 1000 may be upwardly moved. In this case, the mobile device 1000 may display an image of a previous album of an album including the reproduced music on a screen thereof. Also, the mobile device 1000 may reproduce music included in the previous album. While the mobile device 1000 placed on the flat surface reproduces music, the mobile device 1000 may be downwardly moved. In this case, the mobile device 1000 may display an image of a next album following an album including the reproduced music on the screen thereof. Also, the mobile device 1000 may reproduce music included in the next album.

Referring to FIG. 23C, while the mobile device 1000 placed on the flat surface reproduces music, the mobile device 1000 may be moved leftward. In this case, the mobile device 1000 may reproduce previous music of the reproduced music. Also, while the mobile device 1000 placed on the flat surface reproduces music, the mobile device 1000 may be moved rightward. In this case, the mobile device 1000 may reproduce next music following the reproduced music.

Figure 24:
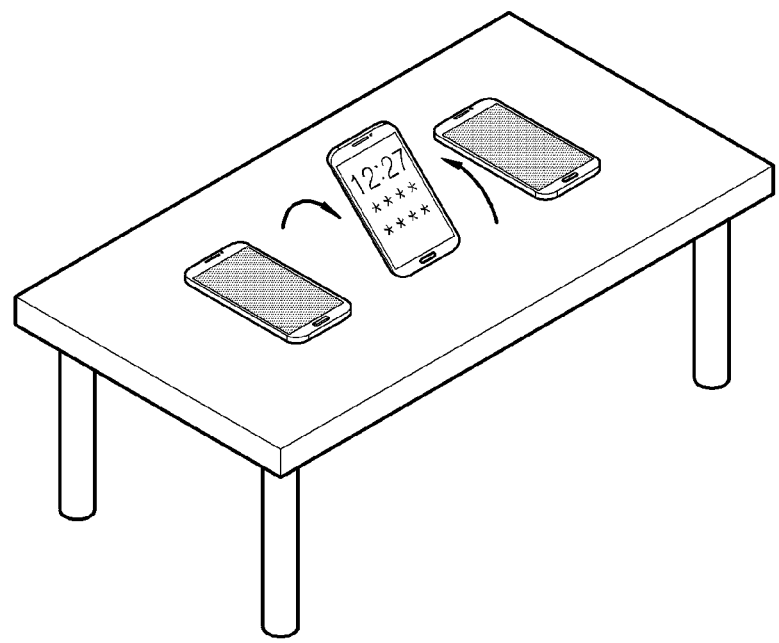
FIG. 24 illustrates an example when, while music is reproduced on the mobile device placed on a flat surface, the mobile device operates in response to tilting inputs, according to an exemplary embodiment.

FIG. 24 illustrates an example when, while the mobile device 1000 that is placed on a flat surface reproduces music, the mobile device 1000 operates in response to tilting inputs, according to an exemplary embodiment.

Referring to FIG. 24, the mobile device 1000 placed on the flat surface may reproduce music while a screen of the mobile device 1000 is deactivated. Here, while music is being reproduced, when a user spaces apart a portion of the mobile device 1000 from the flat surface, the screen of the mobile device 1000 may be activated. Also, the mobile device 1000 may display an album image and lyrics of the reproduced music on the screen.

Figure 25:
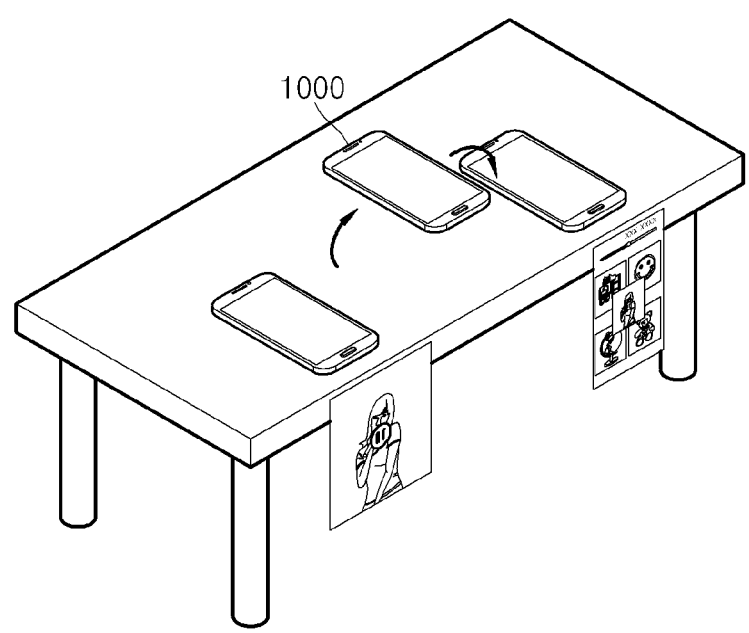
FIG. 25 illustrates an example when, while music is reproduced on the mobile device placed on a flat surface, the mobile device operates when a user lifts up the mobile device and then puts the mobile device down on the flat surface, according to an exemplary embodiment.

FIG. 25 illustrates an example when, while the mobile device 1000 that is placed on a flat surface reproduces music, the mobile device 1000 operates as a user lifts up the mobile device 1000 and then puts the mobile device 1000 down on the flat surface, according to an exemplary embodiment.

As illustrated in FIG. 25, the mobile device 1000 placed on the flat surface may reproduce music, and an album image of the reproduced music may be displayed on a screen of the mobile device 1000. In this case, the user may lift up the mobile device 1000 that reproduces music and then may put the mobile device 1000 down on the flat surface. By doing so, album images of a plurality of pieces of music that are included in an upper folder above a folder including the reproduced music may be displayed on the screen of the mobile device 1000.

Figure 26:
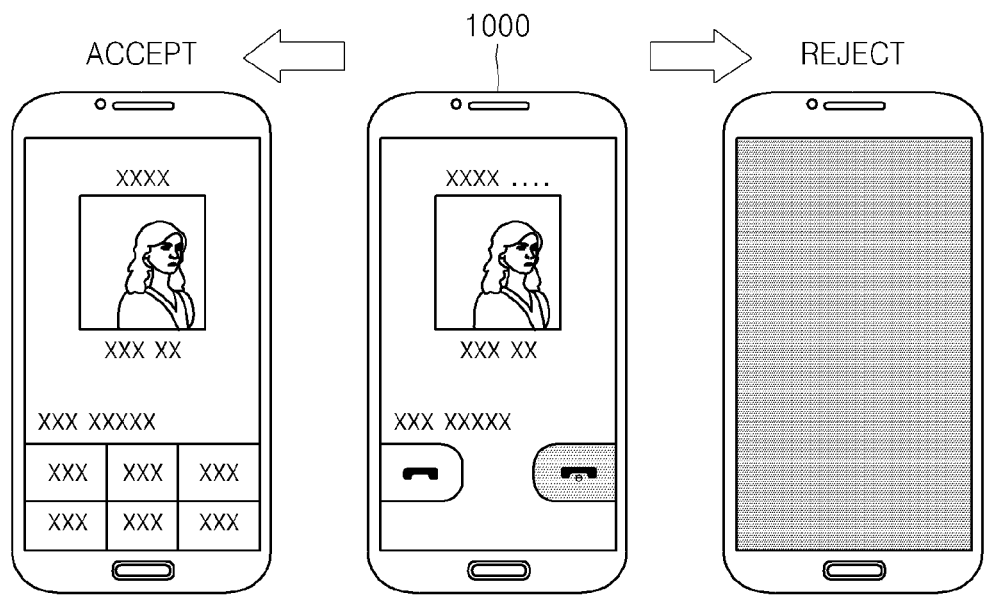
FIG. 26 illustrates an example when the mobile device operates in response to a movement of the mobile device when the mobile device placed on a flat surface receives an incoming call request signal, according to an exemplary embodiment.

FIG. 26 illustrates an example when the mobile device 1000 that is placed on a flat surface receives an incoming call request signal, and the mobile device 1000 operates in response to movement thereof, according to an exemplary embodiment.

Referring to FIG. 26, the mobile device 1000 placed on the flat surface may receive the incoming call request signal. In this case, if a user moves the mobile device 1000 leftward, the mobile device 1000 may allow an incoming call. Also, if the user moves the mobile device 1000 rightward, the mobile device 1000 may reject the incoming call. In this case, a user interface may be displayed on a screen of the mobile device 1000 so as to guide the user to move the mobile device 1000 in a direction that allows or rejects reception of an incoming call.

Figure 27:
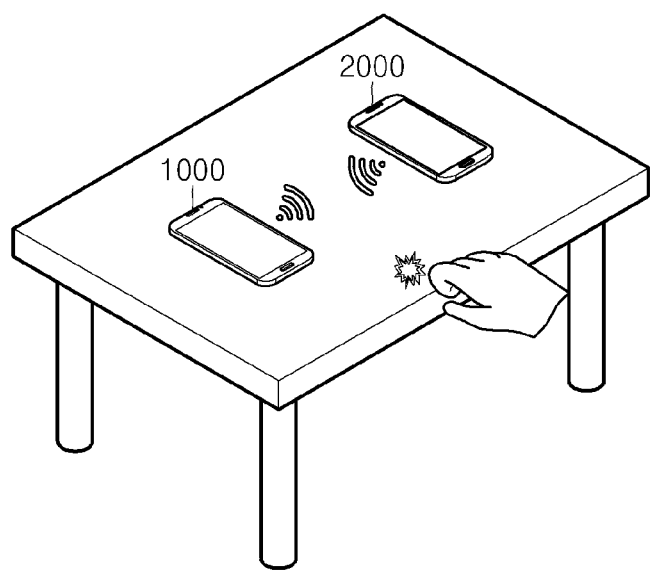
FIG. 27 illustrates an example when the mobile device and another mobile device that are placed on a flat surface receive a user input, according to an exemplary embodiment.

FIG. 27 illustrates an example when the mobile device 1000 and another mobile device 2000 that are placed on a flat surface receive a user input, according to an exemplary embodiment.

Referring to FIG. 27, while the mobile device 1000 and the other mobile device 2000 are placed on the flat surface, a user may hit the flat surface. Also, the mobile device 1000 and the other mobile device 2000 may receive a hitting input from the user and may establish a communication channel therebetween. Also, while the mobile device 1000 and the other mobile device 2000 are placed on the flat surface, the mobile device 1000 and the other mobile device 2000 may receive various inputs from the user and thus may perform preset operations.

Figure 28:
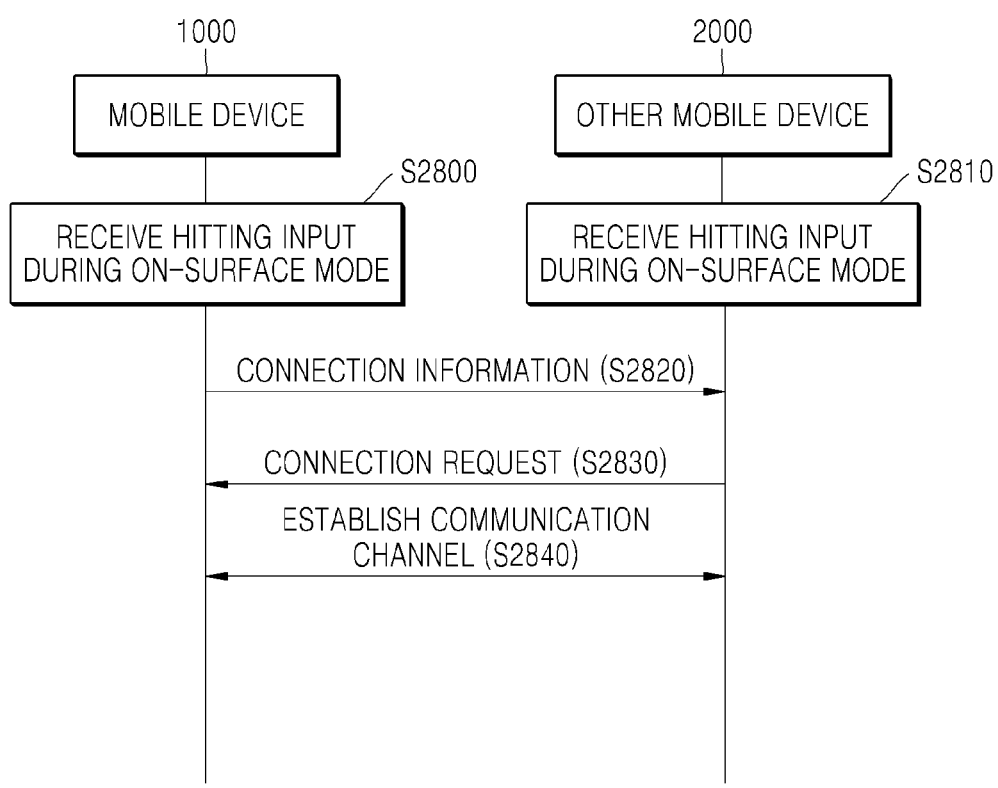
FIG. 28 is a flowchart of a method of establishing a communication channel between the mobile device and another mobile device placed on a flat surface, the method being performed by the mobile device and the other mobile device, according to an exemplary embodiment.

FIG. 28 is a flowchart of a method of establishing a communication channel between the mobile device 1000 and the other mobile device 2000 that are placed on a flat surface, the method being performed by the mobile device 1000 and the other mobile device 2000, according to an exemplary embodiment.

In operation S2800, the mobile device 1000 receives a hitting input during an on-surface mode, and in operation S2810, the other mobile device 2000 receives a hitting input during an on-surface mode. While the mobile device 1000 and the other mobile device 2000 are placed on the flat surface and a user hits the flat surface, the mobile device 1000 and the other mobile device 2000 may sense a hitting input by the user.

In operation S2820, the mobile device 1000 provides connection information about the mobile device 1000 to the other mobile device 2000. For example, the mobile device 1000 may broadcast the connection information about the mobile device 1000 to the other mobile device 2000. The connection information about the mobile device 1000 may include, but is not limited to, an identification (ID) value of the mobile device 1000, a communication method usable by the mobile device 1000, an access address for accessing the mobile device 1000, and authentication information of the mobile device 1000. The communication method usable by the mobile device 1000 may include, but is not limited to, Wi-Fi communication, Bluetooth communication, and near field communication (NFC).

In operation S2830, the other mobile device 2000 transmits a communication connection request to the mobile device 1000. The other mobile device 2000 may request the mobile device 1000 for the communication connection by using the received connection information. For example, the other mobile device 2000 may determine a communication method for connection with the mobile device 1000, and may transmit an ID value and authentication information of the other mobile device 2000 to the mobile device 1000 by using the determined communication method.

In operation S2840, the mobile device 1000 and the other mobile device 2000 establish a communication channel therebetween. The mobile device 1000 may authenticate the other mobile device 2000, and the other mobile device 2000 may authenticate the mobile device 1000. When the mobile device 1000 and the other mobile device 2000 are authenticated, the mobile device 1000 and the other mobile device 2000 may establish the communication channel therebetween.

Figure 29:
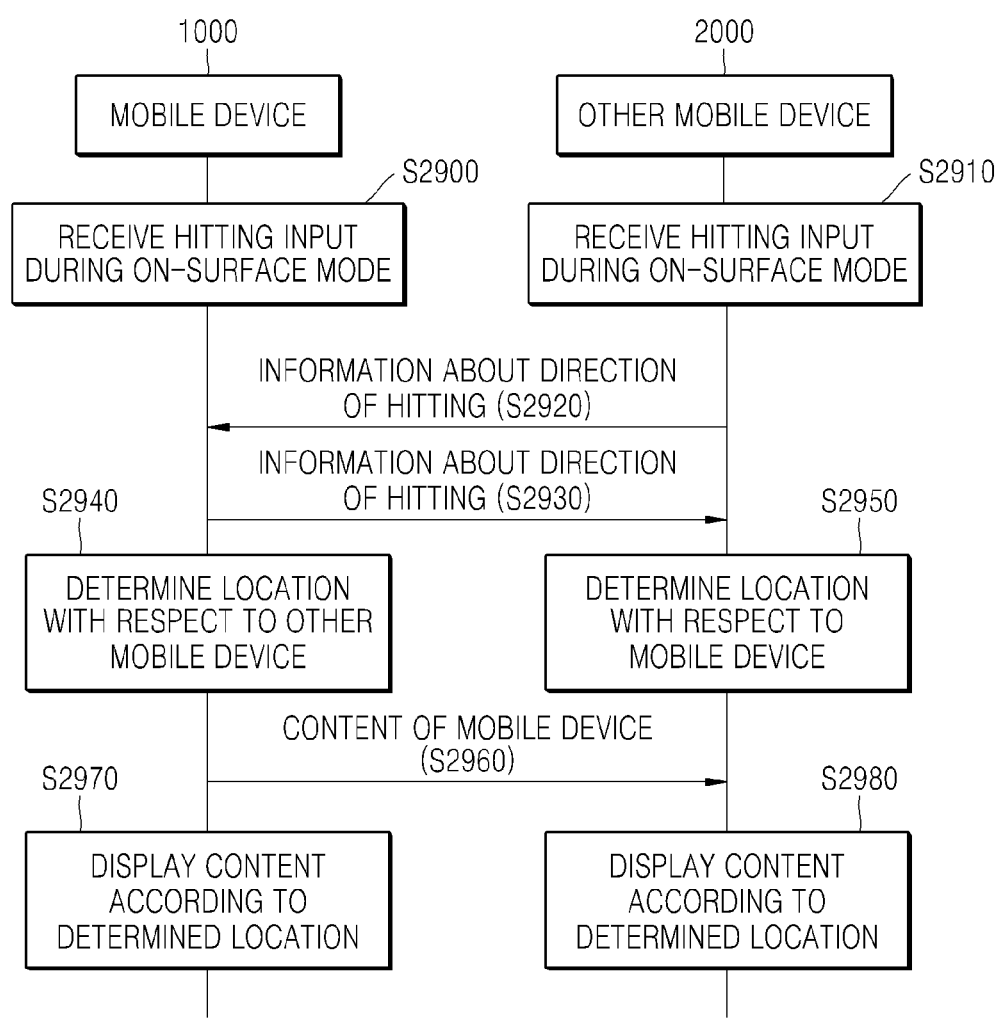
FIG. 29 is a flowchart of a method of displaying content on the mobile device and the other mobile device that are placed on a flat surface, according to an exemplary embodiment.

FIG. 29 is a flowchart of a method of displaying content by the mobile device 1000 and the other mobile device 2000 that are placed on a flat surface, according to an exemplary embodiment.

In operations S2900 and S2910, the mobile device 1000 and the other mobile device 2000 respectively receive hitting inputs during an on-surface mode. While the mobile device 1000 and the other mobile device 2000 are placed on the flat surface and a user hits the flat surface, the mobile device 1000 and the other mobile device 2000 may sense a hitting input by the user.

In operation S2920, the other mobile device 2000 transmits to the mobile device 1000 information about a direction of the input hitting that is determined with respect to the other mobile device 2000. When the user hits the flat surface and thus the hitting input is received from the user, the other mobile device 2000 may determine the direction of a point of the flat surface where the hitting input appear. In this regard, the direction may be based on the other mobile device 2000. For example, the other mobile device 2000 may determine that the user has hit the flat surface at a point to the left with respect to the other mobile device 2000.

In operation S2930, the mobile device 1000 transmits to the other mobile device 2000 information about a direction of the hitting input that is determined with respect to the mobile device 1000. When the user hits the flat surface and thus the hitting input is received from the user, the mobile device 1000 may determine the direction of a point of the flat surface where the hitting input occurred. In this regard, the direction may be based on the mobile device 1000. For example, the mobile device 1000 may determine that the user hit the flat surface plate at a point to the right with respect to the mobile device 1000.

In operation S2940, the mobile device 1000 determines its location with respect to the other mobile device 2000. Based on hitting direction information from the other mobile device 2000, the mobile device 1000 may determine its location with respect to the other mobile device 2000. For example, the mobile device 1000 may recognize that a right side thereof received the hitting input, and a left side of the other mobile device 2000 received a hitting input, and thus, the mobile device 1000 may determine that the mobile device 1000 is located at a left side of the other mobile device 2000.

In operation S2950, the other mobile device 2000 determines its location with respect to the mobile device 1000. Based on hitting direction information from the mobile device 1000, the other mobile device 2000 may determine its location with respect to the mobile device 1000. For example, the other mobile device 2000 may recognize that the right side of the mobile device 1000 received a hitting input, and that the left side of the other mobile device 2000 received a hitting input, and thus the other mobile device 2000 may determine that the other mobile device 2000 is located at the right side of the mobile device 1000.

In operation S2960, the mobile device 1000 transmits content of the mobile device 1000 to the other mobile device 2000. The mobile device 1000 may transmit content to be shared with the other mobile device 2000 to the other mobile device 2000. For example, the mobile device 1000 may transmit photos that are stored therein to the other mobile device 2000. Also, the mobile device 1000 may transmit information about a folder where the photos are stored, and information about an order of displaying the photos to the other mobile device 2000.

In operation S2970, the mobile device 1000 may display content according to the determined location. The mobile device 1000 may display, on a screen thereof, the content that corresponds to the location of the mobile device 1000, in consideration of where the content is stored, and a display order with respect to the content.

In operation S2980, the other mobile device 2000 may display the content according to the determined location. The other mobile device 2000 may display, on a screen thereof, the content that corresponds to the location of the other mobile device 2000, in consideration of a folder where the content is stored, and a display order with respect to the content.

Figure 30:
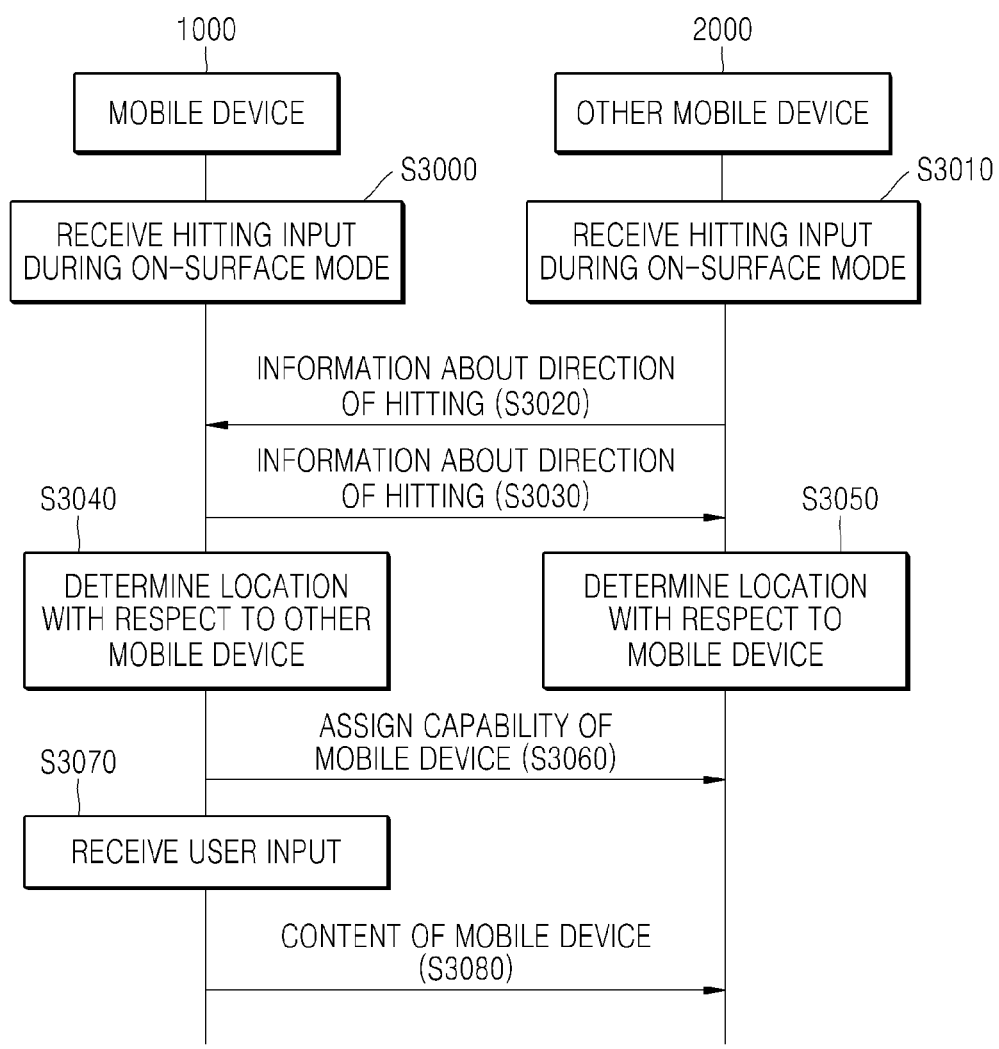
FIG. 30 is a flowchart of a method of assigning capabilities to the mobile device and the other mobile device place on a flat surface, the method being performed by the mobile device and the other mobile device, and a method of transmitting content to the other mobile device, the method being performed by the mobile device, according to an exemplary embodiment.

FIG. 30 is a flowchart of a method of assigning capabilities to the mobile device 1000 and the other mobile device 2000 placed on a flat surface, the method being performed by the mobile device 1000 and the other mobile device 2000, and a method of transmitting content to the other mobile device 2000, the method being performed by the mobile device 1000, according to an exemplary embodiment.

In operations S3000 and S3010, the mobile device 1000 and the other mobile device 2000 receive hitting inputs, respectively, during an on-surface mode.

In operation S3020, the other mobile device 2000 transmits to the mobile device 1000 information about a hitting direction that is determined with respect to the other mobile device 2000, and in operation S3030, the mobile device 1000 transmits to the other mobile device 2000 information about a hitting direction that is determined with respect to the mobile device 1000.

In operation S3040, the mobile device 1000 determines its location with respect to the other mobile device 2000, and in operation S3050, the other mobile device 2000 determines its location with respect to the mobile device 1000.

In operation S3060, the mobile device 1000 and the other mobile device 2000 assign capabilities to each other. The mobile device 1000 may provide information about capabilities supported by the mobile device 1000 to the other mobile device 2000, and the other mobile device 2000 may provide information about capabilities supported by the other mobile device 2000 to the mobile device 1000. Also, the mobile device 1000 and the other mobile device 2000 may select capabilities to be assigned, and may assign the selected capabilities to each other.

The capabilities may be assigned so that the mobile device 1000 may perform a capability (e.g., function) of a display, and the other mobile device 2000 may perform a capability (e.g., function) of a speaker. Also, for example, the capabilities may be assigned so that the mobile device 1000 may perform a capability of a left speaker, and the other mobile device 2000 may perform a capability of a right speaker.

In operation S3080, the mobile device 1000 transmits content of the mobile device 1000 to the other mobile device 2000. The mobile device 1000 may transmit the content that is displayed on a screen of the mobile device 1000, to the other mobile device 2000.

Figure 31:
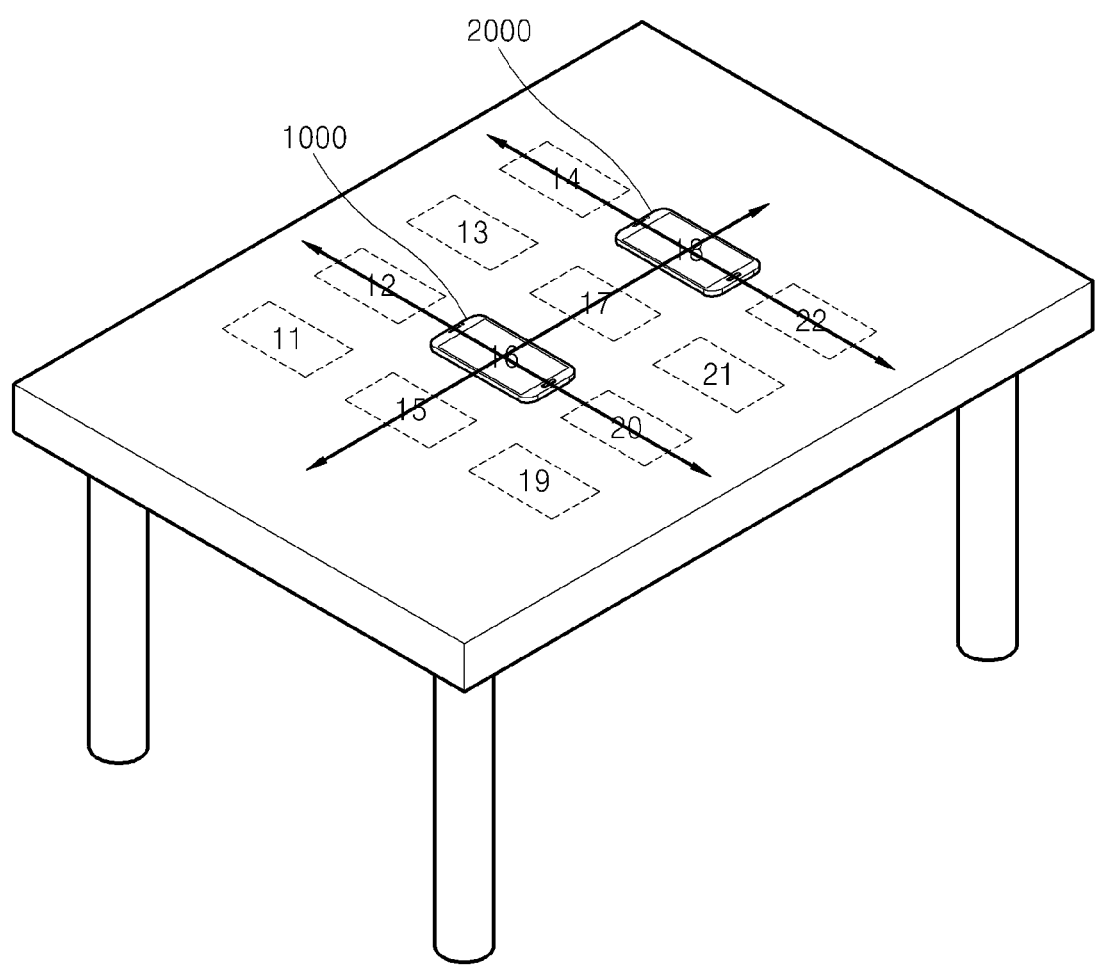
FIG. 31 illustrates an example when photos stored in the mobile device are displayed on screens of the mobile device and the other mobile device that are placed on a flat surface, according to an exemplary embodiment.

FIG. 31 illustrates an example when photos of the mobile device 1000 are displayed on screens of the mobile device 1000 and the other mobile device 2000 that are placed on a flat surface, according to an exemplary embodiment.

Referring to FIG. 31, the mobile device 1000 may be placed at a left side of the other mobile device 2000 on the flat surface. In this case, based on locations of the mobile device 1000 and the other mobile device 2000, a photo 16 may be displayed on the screen of the mobile device 1000, and a photo 18 may be displayed on the screen of the other mobile device 2000.

Also, when the mobile device 1000 is moved in an up, down, left, or right direction on the flat surface, the photo 16 displayed on the mobile device 1000 may be changed. Also, when the other mobile device 2000 is moved in an up, down, left, or right direction on the flat surface, the photo 18 displayed on the other mobile device 2000 may be changed.

Figure 32:
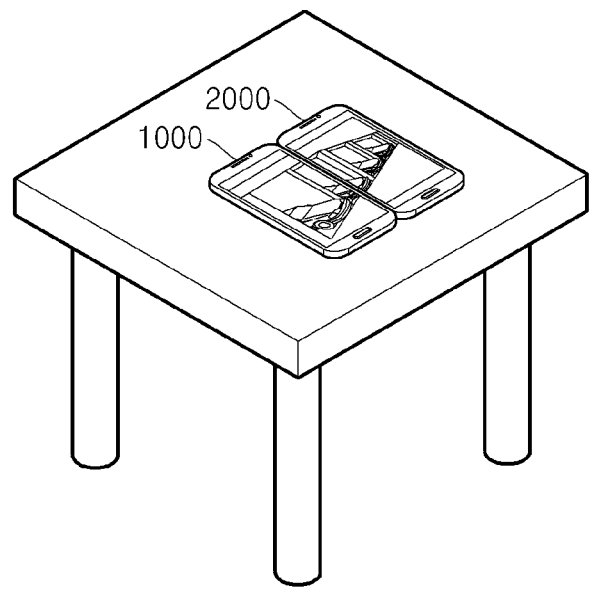
FIG. 32 illustrates an example when one photo is displayed on screens of the mobile device and the other mobile device placed on a flat surface, according to an exemplary embodiment.

FIG. 32 illustrates an example when one photo is displayed on screens of the mobile device 1000 and the other mobile device 2000 that are placed on a flat surface, according to an exemplary embodiment.

As illustrated in FIG. 32, a right portion of a bezel of the mobile device 1000 may contact a left portion of a bezel of the other mobile device 2000 on the flat surface. By doing so, a photo on the mobile device 1000 may be divided into two pieces, and the two pieces of the photo may be respectively displayed on the mobile device 1000 and the other mobile device 2000.

Figure 33:
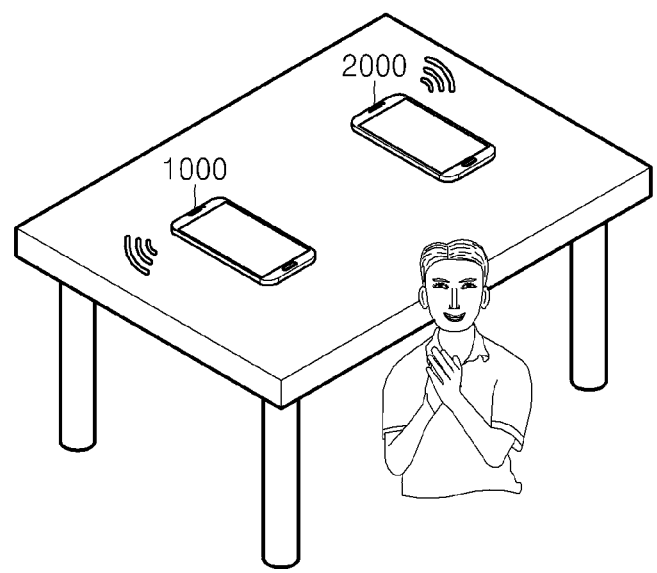
FIG. 33 illustrates an example when the mobile device and the other mobile device assign and perform capabilities of a speaker, according to an exemplary embodiment.

FIG. 33 illustrates an example when the mobile device 1000 and the other mobile device 2000 assign capabilities to each other and perform capabilities of a speaker, according to an exemplary embodiment.

Referring to FIG. 33, the mobile device 1000 may be placed at a right side of the other mobile device 2000, and the mobile device 1000 and the other mobile device 2000 may co-reproduce the same music. In this case, the mobile device 1000 may perform a capability of a left speaker, and the other mobile device 2000 may perform a capability of a right speaker. Also, the mobile device 1000 and the other mobile device 2000 may synchronize the same music being reproduced by the mobile device 1000 with the same music being reproduced by the other mobile device 2000, and to do so, the mobile device 1000 and the other mobile device 2000 may exchange synchronization information.

Figure 34:
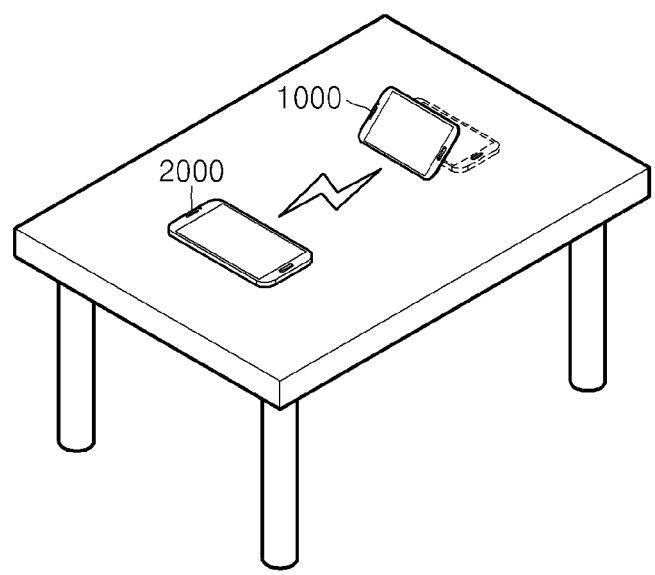
FIG. 34 illustrates an example when the mobile device transmits content to the other mobile device in response to a tilting input, according to an exemplary embodiment.

FIG. 34 illustrates an example when the mobile device 1000 transmits content to the other mobile device 2000 in response to a tilting input, according to an exemplary embodiment.

Referring to FIG. 34, although a left portion of a bezel of the mobile device 1000 contacts a flat surface, top, bottom, and right portions of the bezel of the mobile device 1000 may be spaced apart from the flat surface. Also, a front surface of the mobile device 1000 may be tilted in a left side direction of the mobile device 1000. Accordingly, the mobile device 1000 may transmit the content to the other mobile device 2000 that is placed at the left side of the mobile device 1000.

Figure 35:
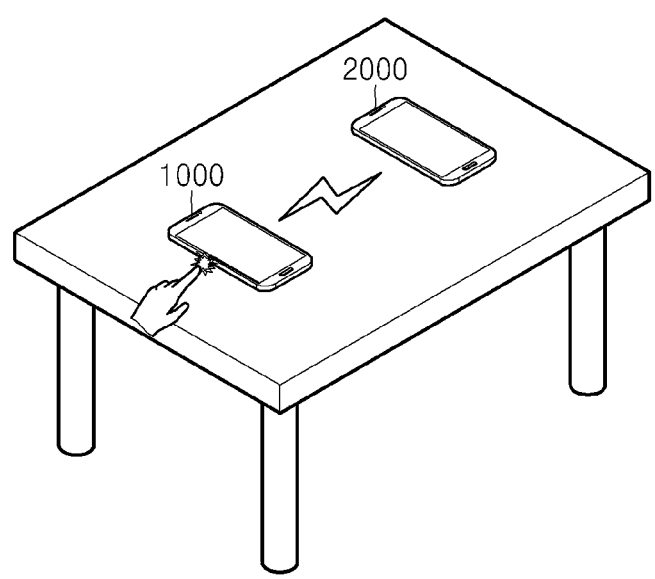
FIG. 35 illustrates an example when the mobile device transmits content to the other mobile device in response to a bezel input, according to an exemplary embodiment.

FIG. 35 illustrates an example when the mobile device 1000 transmits content to the other mobile device 2000 in response to a bezel input, according to an exemplary embodiment.

Referring to FIG. 35, a user may touch a left portion of a bezel of the mobile device 1000. By doing so, the mobile device 1000 may transmit content of the mobile device 1000 to the other mobile device 2000 that is placed at a right side of the mobile device 1000.

Figure 36:
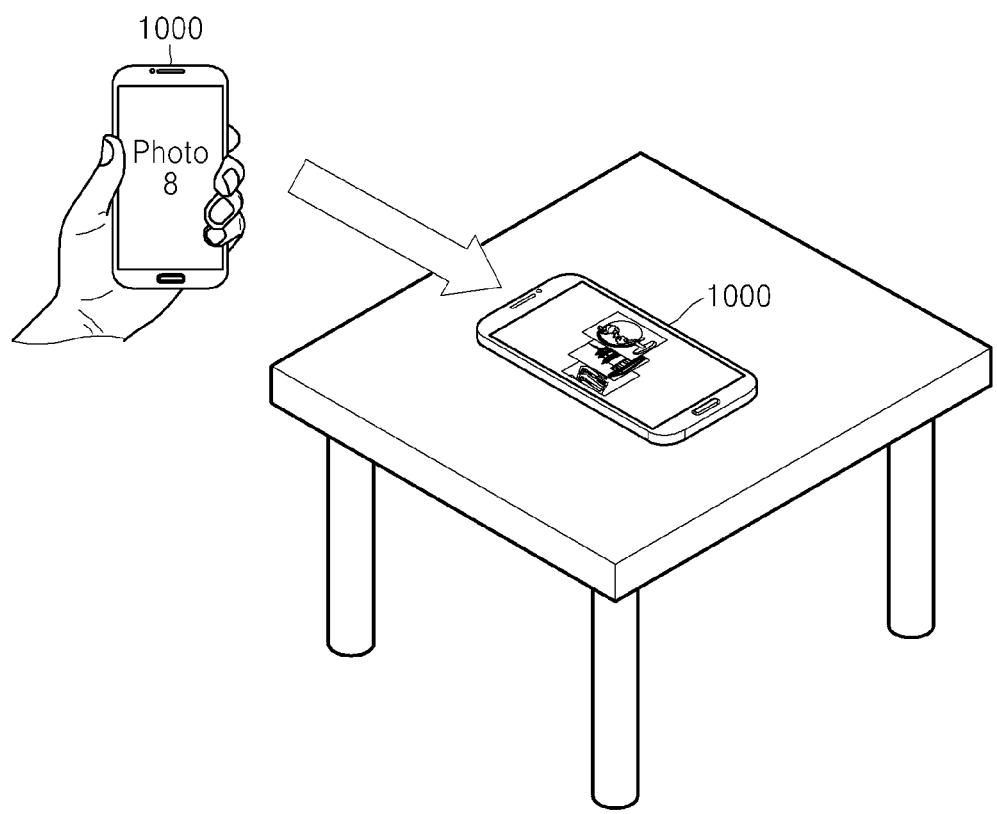
FIG. 36 illustrates an example when the mobile device performs a preset operation when the mobile device held by a user is placed on a flat surface, according to an exemplary embodiment.

FIG. 36 illustrates an example when the mobile device 1000 held by a user is placed on a flat surface and performs a preset operation, according to an exemplary embodiment.

As illustrated in FIG. 36, the mobile device 1000 held by the user may be placed on the flat surface. While the mobile device 1000 is held by the user, the mobile device 1000 may operate in an on-hand mode. Also, when the mobile device 1000 is placed on the flat surface, the mobile device 1000 may change its input mode from the on-hand mode into an on-surface mode. When the mobile device 1000 is placed on the flat surface, an object that is displayed on the mobile device 1000 may be changed.

Figure 37:
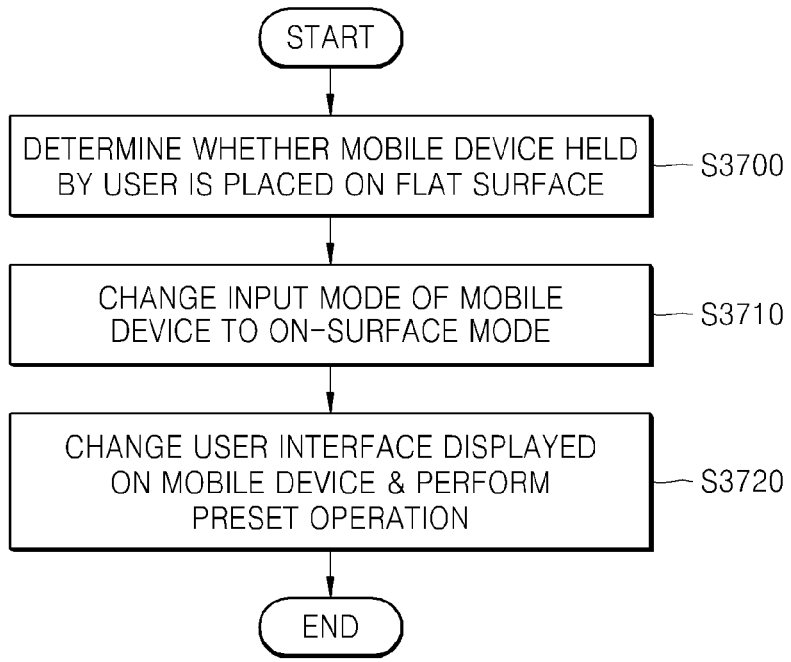
FIG. 37 is a flowchart of a method of changing an input mode and a user interface when the mobile device is placed on a flat surface, the method performed by the mobile device, according to an exemplary embodiment.

FIG. 37 is a flowchart of a method of changing an input mode and a user interface since the mobile device 1000 is placed on a flat surface, the method being performed by the mobile device 1000, according to an exemplary embodiment.

In operation S3700, when the mobile device 1000 held by a user is placed on the flat surface, the mobile device 1000 determines whether the mobile device 1000 is placed on the flat surface by using a sensor in the structure thereof. The sensor may include at least one of a vibration sensor, a gyro sensor, an acceleration sensor, a pressure sensor, a gravity sensor, and a touch sensor. The mobile device 1000 may sense shaking thereof by using the sensor, and when a shaking level is equal to or less than a preset value, the mobile device 1000 may determine that the mobile device 1000 is placed on the flat surface.

The mobile device 1000 may determine whether the mobile device 1000 is placed on the flat surface by using a camera thereof. For example, if a brightness of an image captured by using a rear side camera of the mobile device 1000 is equal to or less than a preset value, and a brightness of an image captured by using a front side camera of the mobile device 1000 is equal to or higher than the preset value, the mobile device 1000 may determine that the mobile device 1000 is placed on the flat surface with a rear side thereof facing the flat surface. As another example, if the brightness of the image captured by using the rear side camera of the mobile device 1000 is greater than the preset value, and the brightness of the image captured by using the front side camera of the mobile device 1000 is less than the preset value, the mobile device 1000 may determine that the mobile device 1000 is placed on the flat surface with a front side thereof facing the flat surface.

In operation S3710, the mobile device 1000 changes its input mode to the on-surface mode. Since the mobile device 1000 is placed on the flat surface, the mobile device 1000 may change its input mode from the on-hand mode to the on-surface mode. Also, the mobile device 1000 may activate a sensor to receive a user input during the on-surface mode. Also, the mobile device 1000 may deactivate a sensor that is not used during the on-surface mode.

In operation S3720, since the mobile device 1000 is placed on the flat surface, the mobile device 1000 changes a displayed user interface. The mobile device 1000 may change the user interface, which is displayed while the mobile device 1000 is held by the user, to a user interface that corresponds to the on-surface mode. The user interface that corresponds to the on-surface mode may be previously set. When the mobile device 1000 is placed on the flat surface, a user interface in a three-dimensional (3D) format may be changed to a user interface in a two-dimensional (2D) format.

In operation S3720, when the mobile device 1000 is placed on the flat surface, the mobile device 1000 may perform the preset operation.

Figure 38:
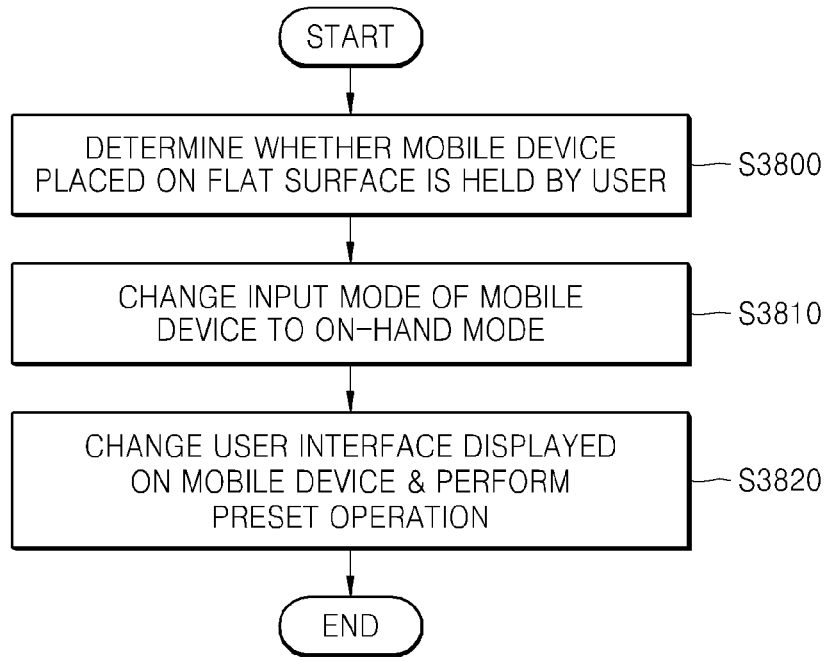
FIG. 38 is a flowchart of a method of changing an input mode and a user interface when the mobile device placed on a flat surface is lifted up by a user, the method being performed by the mobile device, according to an exemplary embodiment.

FIG. 38 is a flowchart of a method of changing an input mode and a user interface when the mobile device 1000 placed on a flat surface is lifted up by a user, the method being performed by the mobile device 1000, according to an exemplary embodiment.

In operation S3800, when the user lifts up the mobile device 1000 from the flat surface, the mobile device 1000 determines whether the mobile device 1000 is held by the user. The mobile device 1000 may determine whether the mobile device 1000 is lifted up by the user by using a sensor in the structure thereof. The sensor may include at least one of a vibration sensor, a gyro sensor, an acceleration sensor, a pressure sensor, a gravity sensor, and a touch sensor. The mobile device 1000 may sense shaking thereof by using the sensor, and when a shaking level is equal to or greater than a preset value, the mobile device 1000 may determine that the mobile device 1000 is held and lifted up by the user.

In operation S3810, the mobile device 1000 changes its input mode to an on-hand mode. When the mobile device 1000 is held by the user, the mobile device 1000 may change its input mode from an on-surface mode to the on-hand mode. Also, the mobile device 1000 may activate a sensor to receive a user input during the on-hand mode. Also, the mobile device 1000 may deactivate a sensor that is not used during the on-hand mode.

In operation S3820, when the mobile device 1000 is held by the user, the mobile device 1000 changes a displayed user interface. The mobile device 1000 may change the user interface, which is displayed while the mobile device 1000 is placed on the flat surface, to a user interface that corresponds to the on-hand mode. The user interface that corresponds to the on-hand mode may be previously set. When the mobile device 1000 is held by the user, a user interface in a 2D format may be changed to a user interface in a 3D format.

In operation S3820, when the mobile device 1000 is held by the user, the mobile device 1000 may perform a preset operation.

FIG. 39 illustrates an example when the mobile device 1000 held by a user is placed on a flat surface and a user interface that is displayed on the mobile device 1000 is changed, according to an exemplary embodiment.

As illustrated in (a) of FIG. 39, the mobile device 1000 held by the user may display the user interface including a photo 8. Afterward, as illustrated in (b) of FIG. 39, the user may put the mobile device 1000 down on the flat surface. Accordingly, the mobile device 1000 may display a user interface including the photo 8 and other photos. In this case, the photo 8 may be displayed while the photo 8 overlaps the other photos.

Figure 40:
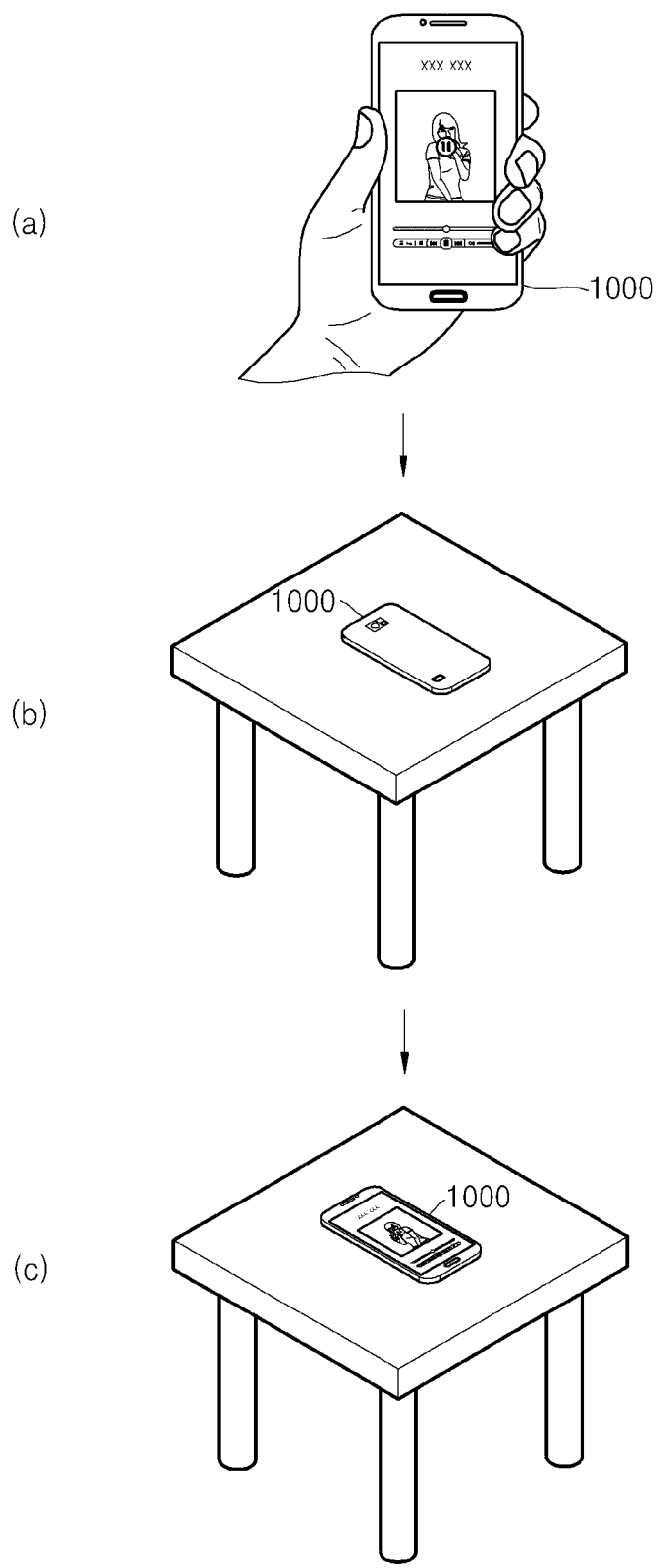
FIG. 40 illustrates an example when the mobile device controls music reproduction when placed on a flat surface, according to an exemplary embodiment.

FIG. 40 illustrates an example when the mobile device 1000 is placed on a flat surface and controls reproduction of music, according to an exemplary embodiment.

As illustrated in (a) of FIG. 40, the mobile device 1000 held by a user may reproduce music during an on-hand mode.

As illustrated in (b) of FIG. 40, a user may put the mobile device 1000 down on the flat surface with a front surface of the mobile device 1000 facing the flat surface. Accordingly, the mobile device 1000 may change its input mode to an on-surface mode and pause reproducing the music.

As illustrated in (c) of FIG. 40, the user may put the mobile device 1000 down on the flat surface with a rear surface of the mobile device 1000 facing the flat surface. Accordingly, the mobile device 1000 may resume reproducing the music.

Figure 41:
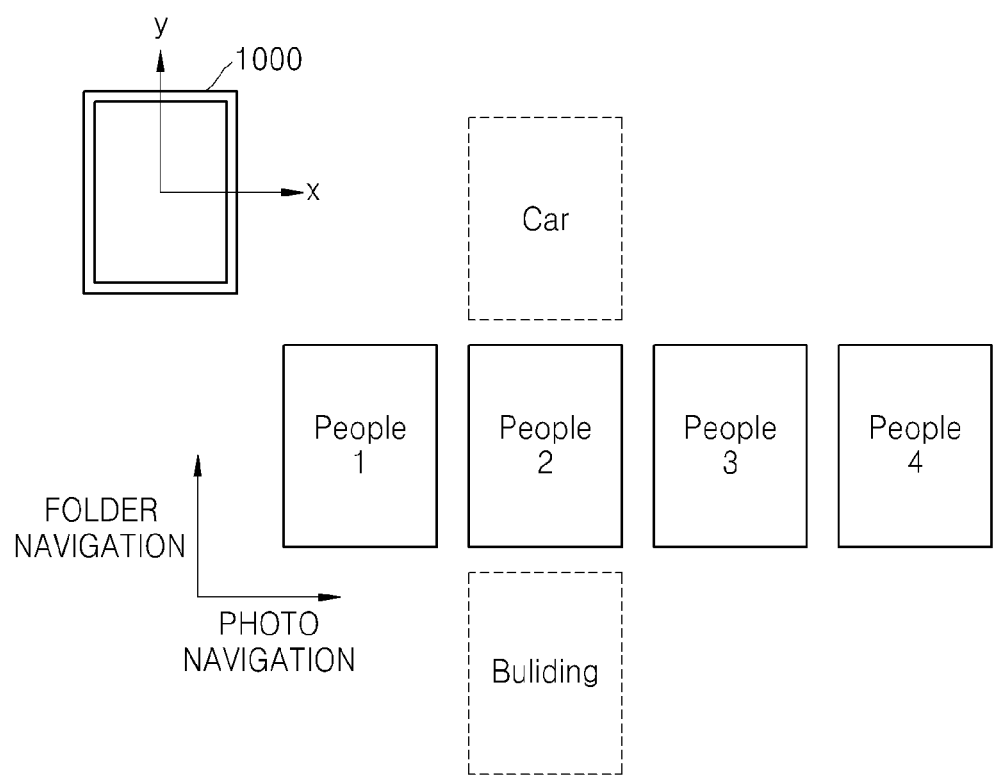
FIG. 41 illustrates an example of a two-dimensional (2D) type user interface, according to an exemplary embodiment.

FIG. 41 illustrates an example of a 2D type user interface, according to an exemplary embodiment. The 2D type user interface may be displayed on a screen of the mobile device 1000 during an on-surface mode.

Referring to FIG. 41, a plurality of contents may be virtually arrayed along X and Y axes on the 2D type user interface. A plurality of contents in a folder may be arrayed along the X-axis, and a plurality of folders may be arrayed along the Y-axis.

For example, while a photo "People 2" in a folder named 'People' is displayed on the screen of the mobile device 1000, when the mobile device 1000 is moved leftward or rightward, other photos (e.g., "People 1", "People 3", and "People 4") in the People folder may be displayed on the screen.

For example, while the photo "People 2" in the People folder is displayed on the screen of the mobile device 1000, when the mobile device 1000 is upwardly moved, a photo in a Car folder may be displayed on the screen.

For example, while the photo "People 2" in the People folder is displayed on the screen of the mobile device 1000, when the mobile device 1000 is downwardly moved, a photo in a Building folder may be displayed on the screen.

Figure 42:
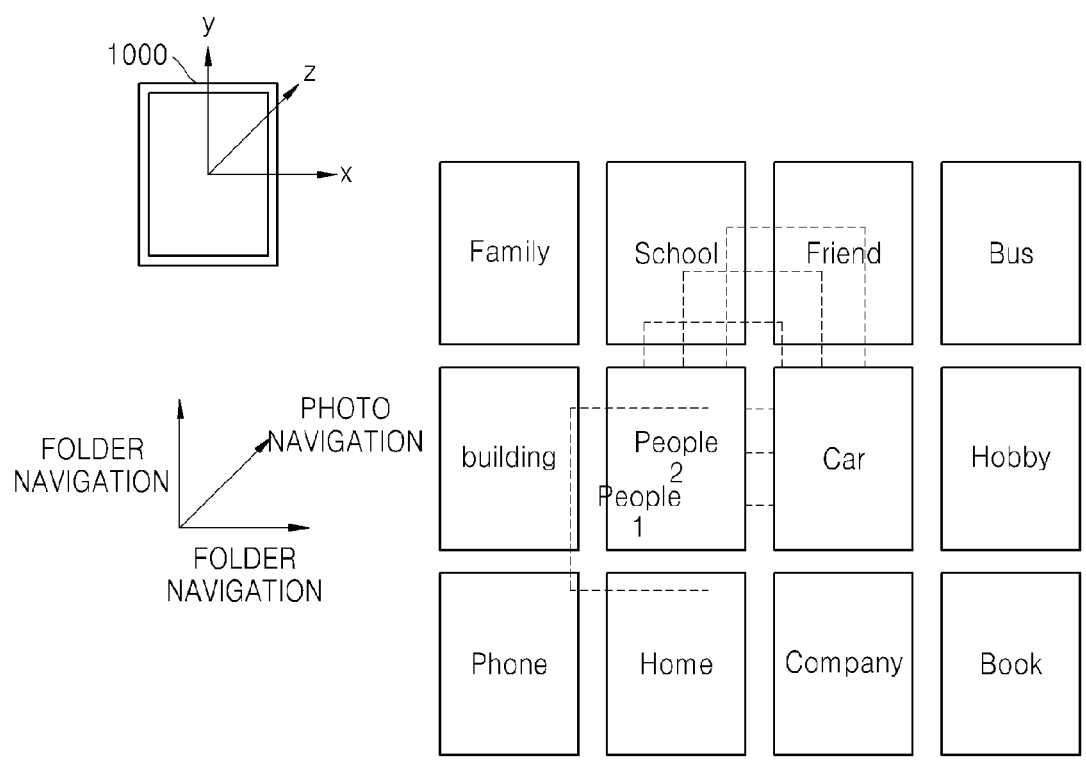
FIG. 42 illustrates an example of a three-dimensional (3D) type user interface, according to an exemplary embodiment.

FIG. 42 illustrates an example of a 3D type user interface, according to an exemplary embodiment. The 3D type user interface may be displayed on a screen of the mobile device 1000 during an on-hand mode.

Referring to FIG. 42, a plurality of content may be virtually arrayed along X, Y, and Z-axes on the 3D type user interface. A plurality of folders may be arrayed along the X and Y-axes, and a plurality of contents in a folder may be arrayed along the Z-axis.

While a photo "People 2" in a folder named 'People' is displayed on the screen of the mobile device 1000, when the mobile device 1000 is moved along the X and Y-axes, a photo in another folder may be displayed on the screen of the mobile device 1000.

For example, while the photo "People 2" in the People folder is displayed on the screen of the mobile device 1000, when the mobile device 1000 is moved along the Z-axis or is tilted in a Z-axis direction, other photos in the People folder may be displayed on the screen of the mobile device 1000.

Figure 43:
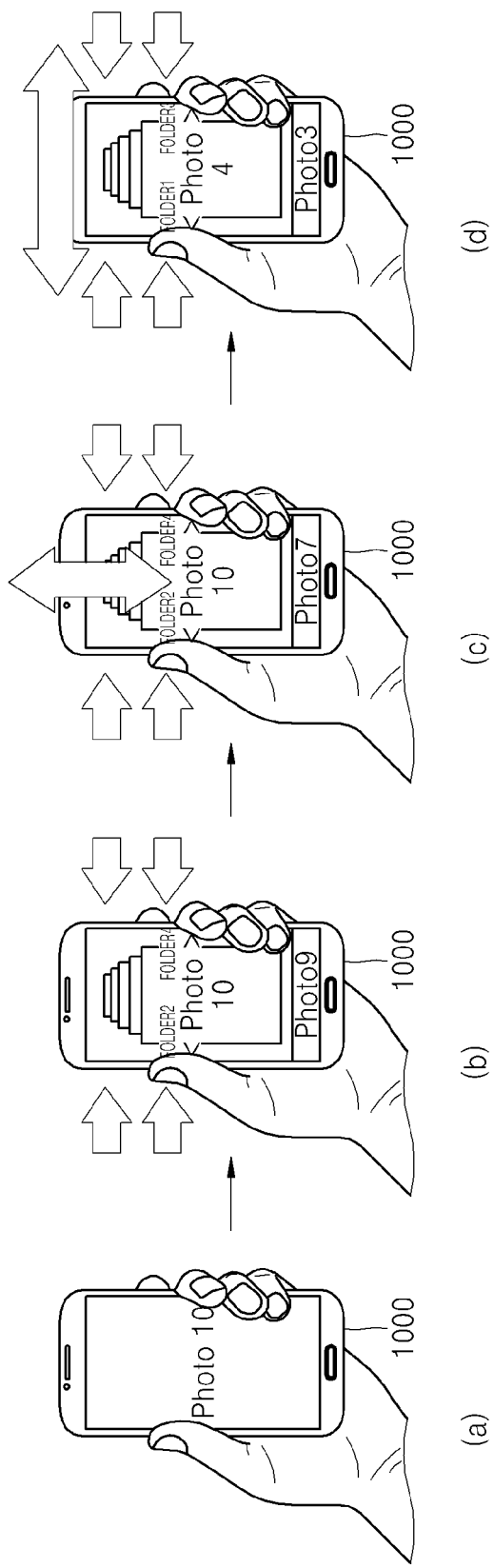
FIG. 43 illustrates an example showing photo navigation on the mobile device during an in-hand mode, according to an exemplary embodiment.

FIG. 43 illustrates an example where the mobile device 1000 navigates photos during an on-hand mode, according to an exemplary embodiment.

Referring to (a) of FIG. 43, the mobile device 1000 that is held by a user may display a photo 10.

Also, as illustrated in (b) of FIG. 43, when a user touches a bezel of the mobile device 1000, the photo 10 may overlap other photos. Also, when the user touches the bezel of the mobile device 1000 by using a power equal to or greater than a preset value, the photo 10 may overlap other photos.

As illustrated in (c) of FIG. 43, when the user moves or tilts the mobile device 1000 in a forward or backward direction (e.g., a Z-axis direction) while the user keeps touching the bezel of the mobile device 1000, other photos in a folder that includes the photo 10 may be sequentially displayed.

As illustrated in (d) of FIG. 43, when the user moves or tilts the mobile device 1000 in a leftward or rightward direction (e.g., an X-axis direction) while the user keeps touching the bezel of the mobile device 1000, a photo in a folder that is different from the folder including the photo 10 may be displayed.

Figure 44:
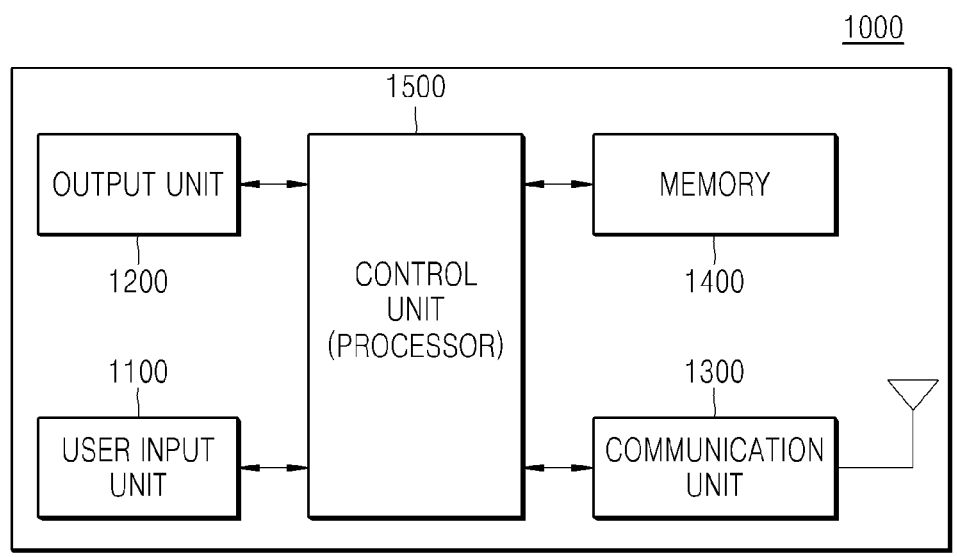
FIG. 44 is a block diagram of the mobile device, according to an exemplary embodiment.

FIG. 44 is a block diagram of the mobile device 1000, according to an exemplary embodiment.

Referring to FIG. 44, the mobile device 1000 includes a user input unit 1100 (e.g., user inputter), an output unit 1200 (e.g., outputter), a communication unit 1300 (e.g., communicator), a memory 1400, and a control unit 1500 (also referred to as a 'processor 1500').

The user input unit 1100 may sense a status of the mobile device 1000 and a status in the vicinity of the mobile device 1000. The user input unit 1100 may sense a user input by using a sensor in the mobile device 1000. The sensor may include at least one of a vibration sensor, a gyro sensor, an acceleration sensor, a pressure sensor, a gravity sensor, and a touch sensor. During an on-surface mode, the user input may be a tilting input, a bezel input, or a hitting input. The user input may include an input when a user slides the mobile device 1000 on the flat surface, but types of the user input are not limited thereto. Also, the user input unit 1100 may sense the user input by using at least one of a camera and a microphone.

The output unit 1200 outputs data of the mobile device 1000. The output unit 1200 may display an object including at least one of an image, a video, and a text. Also, the output unit 1200 may output a voice sound.

The communication unit 1300 exchanges data with the other mobile device 2000 and/or a server (not shown). For example, the communication unit 1300 may exchange data via short-distance communication, mobile communication, etc.

The memory 1400 stores a plurality of pieces of information for operating the mobile device 1000 in various modes, such as, for example, an on-hand mode and an on-surface mode.

The control unit 1500 controls the user input unit 1100, the output unit 1200, the communication unit 1300, and the memory 1400 so that the mobile device 1000 may perform a preset operation during the on-hand mode and the on-surface mode.

The control unit 1500 determines whether the mobile device 1000 is placed on a flat surface by using a sensor in the mobile device 1000. The sensor may include at least one of a vibration sensor, a gyro sensor, an acceleration sensor, a pressure sensor, a gravity sensor, and a touch sensor. The control unit 1500 may determine whether the mobile device 1000 is held by a user. Also, the control unit 1500 determines whether the mobile device 1000 on the flat surface is lifted up and then is put down on the flat surface by the user.

The control unit 1500 selects one of a plurality of input modes. The plurality of input modes may include the on-hand mode and the on-surface mode. For example, when the mobile device 1000 held by the user is placed on the flat surface, the control unit 1500 may select the on-surface mode. As another example, when the mobile device 1000 is activated while the mobile device 1000 is still placed on the flat surface, the control unit 1500 may select the on-surface mode. When the mobile device 1000 is held by the user, the control unit 1500 may select the on-hand mode.

The control unit 1500 performs an operation that corresponds to the selected user input, according to the selected input mode. When the mobile device 1000 is placed on the flat surface, the control unit 1500 may perform an operation that corresponds to the user input during the on-surface mode. The operation of the mobile device 1000 may include an operation of activating the mobile device 1000, an operation of executing a preset application, an operation of performing a preset function of an application, or an operation of changing an object displayed on a screen of the mobile device 1000. Also, operations of the mobile device 1000 may be respectively matched with a hitting input, a tilting input, a bezel input, an input of moving the mobile device 1000 on the flat surface, and an input of changing a direction of the mobile device 1000 on the flat surface.

The control unit 1500 may establish a communication channel with the other mobile device 2000 based on the hitting input during the on-surface mode. The control unit 1500 may transmit connection information about the mobile device 1000 to the other mobile device 2000 by using the communication unit 1300. Also, in response to a connection request from the other mobile device 2000, the control unit 1500 may establish a communication channel with the other mobile device 2000 via the communication unit 1300.

Based on the hitting input during the on-surface mode, the control unit 1500 may determine a location of the mobile device 1000 with respect to the other mobile device 2000. Also, based on the determined location, the control unit 1500 may output content via the output unit 1200.

The control unit 1500 and the other mobile device 2000 may assign predetermined capabilities to each other on the flat surface. Based on the hitting input during the on-surface mode, the control unit 1500 may determine a location of the mobile device 1000 with respect to the other mobile device 2000. Then, based on the determined location, the control unit 1500 may assign a predetermined capability.

The control unit 1500 may transmit content to the other mobile device 2000 placed on the flat surface, according to a user input. For example, when a tilting input is received, the control unit 1500 may transmit the content to the other mobile device 2000 via the communication unit 1300.

Figure 45:
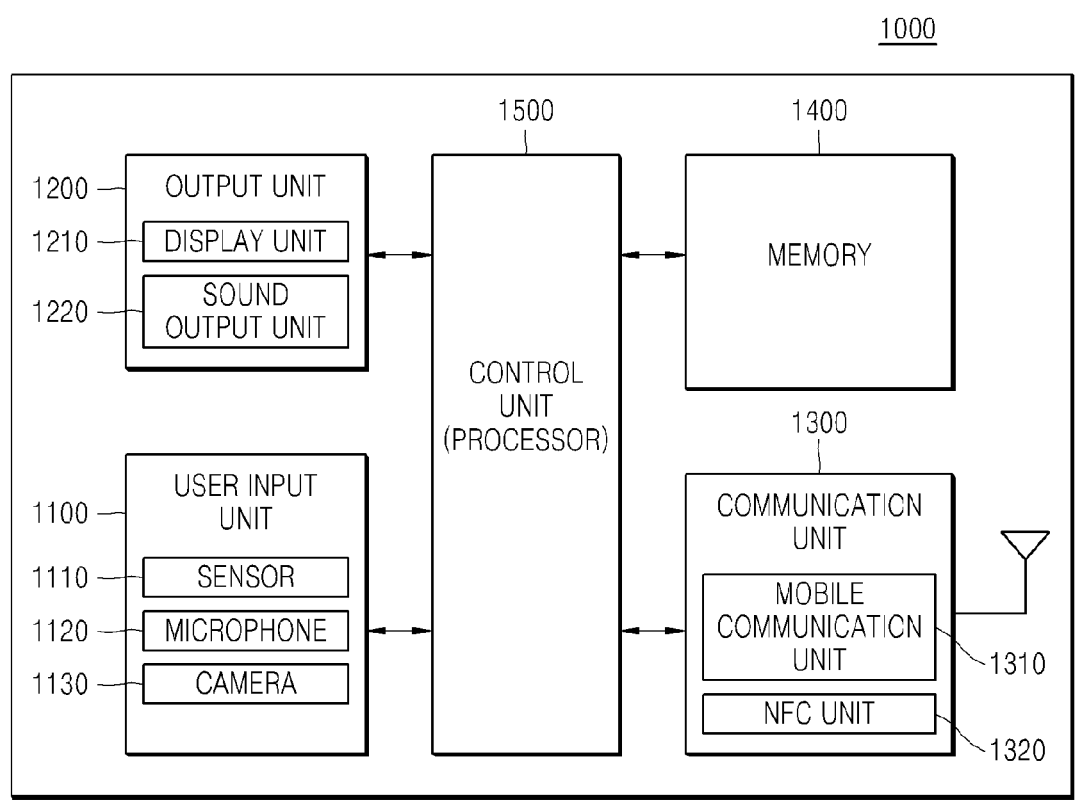
FIG. 45 is a block diagram of the mobile device, according to another exemplary embodiment.

FIG. 45 is a block diagram of the mobile device 1000, according to another exemplary embodiment.

Referring to FIG. 45, a user input unit 1100 in the mobile device 1000 according to the present exemplary embodiment may include a sensor 1110, at least one microphone 1120, and a camera 1130, an output unit 1200 in the mobile device 1000 may include a display unit 1210 and a sound output unit 1220, and a communication unit 1300 in the mobile device 1000 may include a mobile communication unit 1310 and an NFC unit 1320.

The sensor 1110 may sense a status of the mobile device 1000 and a status around the mobile device 1000. The sensor 1110 may include a vibration sensor, a gyro sensor, an acceleration sensor, a pressure sensor, a gravity sensor, a touch sensor, a temperature sensor, or the like.

The camera 1130 may be positioned at front and rear surfaces of the mobile device 1000, and may capture an image around the mobile device 1000.

The at least one microphone 1120 may sense a sound that occurs around the mobile device 1000. The mobile device 1000 may determine a location of the sound by using a microphone array in the mobile device 1000. To do so, a plurality of the microphones 1120 may be disposed at a preset interval at preset locations in the mobile device 1000. For example, four microphones may be disposed, respectively, at vertices of side edges of the mobile device 1000. As another example, four microphones may be disposed so that a virtual line that connects the four microphones may form a rectangle, a square, or a rhombus. As another example, a plurality of microphones may be disposed in the mobile device 1000 such that the plurality of microphones forms a circle. However, one or more exemplary embodiments are not limited thereto.

The microphones 1120 may be directional microphones. In this case, the directional microphones may be disposed to respectively face the side edges of the mobile device 1000.

Also, each of the microphones 1120 included in the mobile device 1000 may sense a sound (a hitting sound) that is generated when the user hits the flat surface. Also, the microphones 1120 included in the mobile device 1000 may respectively generate audio signals indicating the sensed sounds.

The control unit 1500 may compare the audio signals generated by the microphones 1120, and thus, may determine a location of the sound (the hitting sound) that is generated when the user hits the plate. For example, the control unit 1500 may compare times when the hitting sounds are sensed by the microphones 1120, respectively. As another example, the control unit 1500 may compare waveforms and strengths of the audio signals that are generated by the microphones 1120, respectively. The control unit 1500 may determine the location or a direction of the hitting sound based on the comparison result and locations of the microphones 1120.

The display unit 1210 displays data of the mobile device 1000. The display unit 1210 may display an object including at least one of an image, a video, and a text.

The sound output unit 1220 outputs a sound that is reproduced by the mobile device 1000.

Also, the mobile device 1000 may establish a communication channel with the other mobile device 2000 and/or a server (not shown) by using the mobile communication unit 1310 and the NFC unit 1320. Also, the mobile device 1000 may exchange data with the other mobile device 2000 and/or the server by using the mobile communication unit 1310 and the NFC unit 1320.

The one or more exemplary embodiments may be embodied as a recording medium, e.g., a program module to be executed in computers, which include computer-readable commands. The computer-readable recording medium may include any usable medium that may be accessed by computers, volatile and non-volatile media, and detachable and non-detachable media. Also, the computer-readable recording medium may include a computer storage medium and a communication medium. The computer storage medium includes all of volatile and non-volatile media, and detachable and non-detachable media which are designed to store information including computer readable commands, data structures, program modules or other data. The communication medium includes computer-readable commands, a data structure, a program module, and other transmission mechanisms, and includes other information transmission mediums.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. For example, configuring elements that are singular forms may be executed in a distributed fashion, and also, configuring elements that are distributed may be combined and then executed.

While the exemplary embodiments have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing operations of a mobile device according to a plurality of input modes, the method being performed by the mobile device and comprising:
   determining whether the mobile device, which is being held in one hand among hands of a user, is put down on a surface which is flat, external to the mobile device, and different from the hands of the user;
   if the determining of whether the mobile device is put down on the surface indicates that the mobile device is put down on the surface, changing an input mode of the mobile device; and
   performing a preset operation that corresponds to the changed input mode.

2. The method of claim 1, wherein, when the input mode is changed, the method further comprises:
   activating or deactivating a sensor in the mobile device, and
   changing an operation of the mobile device which corresponds to a user input.

3. The method of claim 1, wherein the changing of the input mode comprises changing the input mode from an on-hand mode to an on-surface mode.

4. The method of claim 3, further comprising:
   determining whether the mobile device on the surface is held in one of the hands of the user; and
   when the determining of whether the mobile device on the surface is held in one of the hands of the user indicates that the mobile device is held in one of the hands of the user, changing the input mode from the on-surface mode to the on-hand mode.

5. The method of claim 1, wherein the performing of the preset operation comprises changing a user interface that is displayed on the mobile device to a user interface that corresponds to the changed input mode, and displaying the changed user interface.

6. The method of claim 1, further comprising:
   receiving a user input with respect to the mobile device; and
   performing an operation that corresponds to the received user input, according to the changed input mode.

7. The method of claim 1, further comprising determining a state in which the mobile device is placed on the surface, and
   wherein the performing of the preset operation comprises performing the preset operation that corresponds to the changed input mode according to the state in which the mobile device is placed on the surface.

8. The method of claim 7, wherein the state in which the mobile device is placed on the surface comprises at least one of a state in which the mobile device is placed on the surface so that a front surface of the mobile device faces the surface; a state in which the mobile device is placed on the surface so that a rear surface of the mobile device faces the surface; and a state in which the mobile device is placed vertically on the surface.

9. A non-transitory computer-readable recording medium having recorded thereon a program for executing the method of claim 1.

10. A method of performing an operation of a mobile device according to a user input, the method being performed by the mobile device and comprising:
    in response to determining the mobile device, which is being held in one hand among hands of a user, is put down on a surface, selecting an input mode from among a plurality of input modes of the mobile device;
    receiving, from a user, a hitting input indicating a location at which the user has hit the surface on which the mobile device is put down; and
    performing an operation that corresponds to the location based on the selected input mode,
    wherein the surface is flat, external to the mobile device, and different from the hands of the user.

11. The method of claim 10, wherein the plurality of input modes comprises an on-hand mode and an on-surface mode, and
    wherein, when the mobile device is placed on the surface, the selecting of the input mode comprises selecting the on-surface mode from among the plurality of input modes.

12. The method of claim 10, further comprising establishing a communication channel with another mobile device placed on the surface, according to the hitting input.

13. The method of claim 12, wherein the establishing of the communication channel comprises:
    when the hitting input with a preset pattern is received, broadcasting connection information about the mobile device to the other mobile device;
    receiving, from the other mobile device, a connection request based on the connection information; and
    connecting with the other mobile device, according to the connection request.

14. The method of claim 12, further comprising determining a location of the mobile device with respect to the other mobile device, based on the hitting input, and wherein an object to be displayed on the mobile device and the other mobile device is determined based on the location of the mobile device.

15. The method of claim 12, further comprising:
receiving a tilting input for spacing apart a portion of the mobile device from the surface while another portion of the mobile device remains on the surface; and
when the tilting input is received, transmitting content that is displayed on the mobile device to the other mobile device.

16. The method of claim 12, further comprising:
receiving, from a user, a bezel input indicating that a user has touched a portion of a bezel of the mobile device placed on the surface; and
when the bezel input is received, transmitting content that is displayed on the mobile device to the other mobile device.

17. The method of claim 10, wherein the receiving of the hitting input comprises sensing a vibration that is generated when the surface is hit, by using a vibration sensor of the mobile device.

18. The method of claim 10, wherein the receiving of the hitting input comprises sensing a sound that is generated when the surface is hit, by using a microphone of the mobile device.

19. The method of claim 10, further comprising:
sensing a movement of the mobile device placed on the surface; and
performing an operation that corresponds to the sensed movement of the mobile device.

20. The method of claim 19, wherein the sensing of the movement of the mobile devices comprises receiving a tilting input for spacing apart a portion of the mobile device from the surface while another portion of the mobile device is still placed on the surface.

21. The method of claim 19, wherein the sensing of the movement comprises sensing that a location of the mobile device on the surface is moved while the mobile device is still placed on the surface.

22. The method of claim 19, wherein the sensing of the movement of the mobile device comprises sensing that a direction of the mobile device on the surface is changed while the mobile device is still placed on the surface.

23. The method of claim 10, further comprising:
receiving, from a user, a bezel input indicating that a user has touched a portion of a bezel of the mobile device placed on the surface; and
performing an operation that corresponds to the bezel input.

24. The method of claim 23, further comprising:
sensing a movement of the mobile device placed on the surface, wherein the sensed movement occurs in response to the bezel input; and
performing an operation that corresponds to the bezel input and the sensed movement of the mobile device.

25. A non-transitory computer-readable recording medium having recorded thereon a program for executing the method of claim 10.

26. A mobile device configured to perform operations according to a plurality of input modes, the mobile device comprising:
a user inputter configured to sense a status of the mobile device; and
a controller configured to determine, based on the status, whether the mobile device, which is being held in one hand among hands of a user, is put down on a surface, to change an input mode of the mobile device in response to determining that the mobile device is put down on the surface, and to perform a preset operation that corresponds to the changed input mode,
wherein the surface is flat, external to the mobile device, and different from the hands of the user.

27. A mobile device configured to perform an operation according to a user input, the mobile device comprising:
a user inputter configured to receive, from a user, a hitting input indicating a location at which the user has hit a surface on which the mobile device is placed after being held in one hand among hands of the user; and
a controller configured to, when the mobile device is placed on the surface, select an input mode from among a plurality of input modes of the mobile device, and perform an operation that corresponds to the location based on the selected input mode,
wherein the surface is flat, external to the mobile device, and different from the hands of the user.

28. A mobile device, comprising:
a user inputter configured to, when the mobile device is placed on a surface, receive a hitting input indicating that a user has hit an area of the surface near the mobile device;
a communicator configured to establish a communication channel with another mobile device which has also received the hitting input and to receive authentication information of the other mobile device through the communication channel; and
a controller configured to authenticate the other mobile device based on the authentication information and synchronize an operation of the mobile device with an operation of the other mobile device using the communication channel.

29. The mobile device of claim 28, wherein the controller is configured to synchronize the operations of the mobile device and the other mobile device such that content displayed by the mobile device and content displayed by the other mobile device is displayed in synchronization with each other.

30. The mobile device of claim 29, wherein the controller is configured to synchronize the content of the mobile device and the content of the other mobile device such that a first photograph in an album is displayed by the mobile device, and a second photograph following the first photograph in the album is displayed by the other mobile device.

31. The mobile device of claim 28, wherein the controller is configured to synchronize the operations of the mobile device and the other mobile device such that audio data which is output by the mobile device and audio data which is output by the other mobile device is output in synchronization with each other.

32. The mobile device of claim 31, wherein the controller is configured to synchronize the audio data such that the mobile device outputs audio data corresponding to a left speaker channel, and the other mobile device outputs audio data corresponding to a right speaker channel.

* * * * *